(12) United States Patent
Son et al.

(10) Patent No.: US 9,973,612 B2
(45) Date of Patent: May 15, 2018

(54) MOBILE TERMINAL WITH TOUCH SCREEN AND METHOD OF PROCESSING DATA USING THE SAME

(75) Inventors: Seunghwan Son, Seoul (KR); Joohee Son, Seoul (KR); Hyojin Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1533 days.

(21) Appl. No.: 12/345,427

(22) Filed: Dec. 29, 2008

(65) Prior Publication Data

US 2010/0037167 A1 Feb. 11, 2010

(30) Foreign Application Priority Data

Aug. 8, 2008 (KR) ........................ 10-2008-0077841

(51) Int. Cl.
| | |
|---|---|
| *G06F 3/0481* | (2013.01) |
| *G06F 3/0482* | (2013.01) |
| *G06F 3/0483* | (2013.01) |
| *G06Q 10/10* | (2012.01) |
| *H04M 1/725* | (2006.01) |
| *G06F 3/0486* | (2013.01) |
| *H04M 1/2745* | (2006.01) |

(52) U.S. Cl.
CPC ...... *H04M 1/72561* (2013.01); *G06F 3/0486* (2013.01); *H04M 1/27455* (2013.01); *H04M 1/72547* (2013.01)

(58) Field of Classification Search
CPC .. G06F 3/0482; G06F 3/0481; G06F 3/04817; G06F 3/0483; H04N 5/44543; G06Q 10/10

USPC ............................. 715/810, 764, 702
See application file for complete search history.

(56) References Cited

U.S. PATENT DOCUMENTS

| | | | |
|---|---|---|---|
| 6,195,094 B1 * | 2/2001 | Celebiler | G06F 3/0481 |
| | | | 715/764 |
| 6,539,373 B1 * | 3/2003 | Guha | |
| 7,076,730 B1 * | 7/2006 | Baker | G06Q 10/107 |
| | | | 709/206 |
| 7,234,117 B2 * | 6/2007 | Zaner et al. | 715/758 |
| 7,444,374 B1 * | 10/2008 | Baker | G06F 9/44 |
| | | | 709/206 |
| 7,450,003 B2 * | 11/2008 | Weber et al. | 340/539.2 |
| 8,140,975 B2 * | 3/2012 | Lemay | G06Q 10/107 |
| | | | 715/730 |

(Continued)

FOREIGN PATENT DOCUMENTS

| | | |
|---|---|---|
| EP | 1739533 | 1/2007 |
| WO | 98-48554 | 10/1998 |

*Primary Examiner* — Kevin L Young
*Assistant Examiner* — Erik Stitt
(74) *Attorney, Agent, or Firm* — Lee, Hong, Degerman, Kang & Waimey

(57) ABSTRACT

A method of processing data in a mobile terminal with a touch screen is presented. The method includes simultaneously displaying a first application and a data list including at least one data item in predetermined regions on the touch screen, selecting at least one data item from the data list, moving the selected at least one data item to the region displaying the first application, and using the selected at least one data item to execute a function provided by the first application in response to the moved selected at least one data item.

8 Claims, 23 Drawing Sheets

(56) References Cited

U.S. PATENT DOCUMENTS

| | | | |
|---|---|---|---|
| 2003/0142123 A1* | 7/2003 | Malamud | G06F 3/04812 715/715 |
| 2004/0001094 A1* | 1/2004 | Unnewehr et al. | 345/769 |
| 2005/0149496 A1* | 7/2005 | Mukherjee et al. | 707/3 |
| 2005/0235037 A1 | 10/2005 | Tropartz | |
| 2006/0212822 A1* | 9/2006 | Facemire | G06F 17/241 715/769 |
| 2006/0271861 A1* | 11/2006 | Yolleck | G06F 8/00 715/760 |
| 2007/0157101 A1* | 7/2007 | Indiran | H04L 67/36 715/769 |
| 2007/0157129 A1* | 7/2007 | Facemire | G06F 17/30554 |
| 2007/0276811 A1* | 11/2007 | Rosen | G06F 3/0483 |
| 2008/0141150 A1* | 6/2008 | Kalaboukis | G06F 3/0481 715/764 |
| 2009/0170492 A1* | 7/2009 | Lee | 455/418 |
| 2009/0247112 A1* | 10/2009 | Lundy et al. | 455/404.1 |
| 2009/0249232 A1* | 10/2009 | Lundy et al. | 715/764 |
| 2009/0249240 A1* | 10/2009 | Lundy et al. | 715/771 |
| 2009/0249252 A1* | 10/2009 | Lundy et al. | 715/817 |
| 2009/0288012 A1* | 11/2009 | Hertel et al. | 715/738 |
| 2009/0319618 A1* | 12/2009 | Affronti | G06Q 10/107 709/206 |

* cited by examiner

MOBILE TERMINAL WITH TOUCH SCREEN AND METHOD OF PROCESSING DATA USING THE SAME

CROSS-REFERENCE TO RELATED APPLICATIONS

Pursuant to 35 U.S.C. § 119(a), this application claims the benefit of earlier filing date and right of priority to Korean Application No. 10-2008-0077841, filed on Aug. 8, 2008, the contents of which are hereby incorporated by reference herein in its entirety.

BACKGROUND OF THE INVENTION

Field of the Invention

The present invention relates to a mobile terminal with a touch screen. Specifically, a mobile terminal comprising a touch screen allowing simple access between an application and data, and a method of processing data using the same.

Discussion of the Related Art

As more functions are added to terminals such as personal computers, laptop computers, and cellular phones, the terminals become multimedia players with multiple functions such as capturing pictures or videos, playing music, displaying videos, providing games, and receiving broadcasting programs.

Terminals may be divided into mobile terminals and stationary terminals. Mobile terminals may be classified into handheld terminals and vehicle mount terminals according to the portability of the terminals.

As terminals provide more complex and various functions, a menu structure associated with the functions becomes complicated. Thus, a user must navigate through various complicated menus to access a desired function. Accordingly, efforts have been made to simplify the complicated menu structure to provide a convenient user interface (UI). Specifically, it is an object of one embodiment of the present invention to provide a simple user interface in a mobile terminal with a small screen.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a method of processing data in a mobile terminal with a touch screen is presented. The method includes simultaneously displaying a first application and a data list including at least one data item in predetermined regions on the touch screen, selecting at least one data item from the data list, moving the selected at least one data item to the region displaying the first application, and using the selected at least one data item to execute a function provided by the first application in response to the moved selected at least one data item.

In one feature, the region displaying the first application comprises a plurality of function fields for respectively providing different functions, the selected at least one data item is moved to one of the plurality of function fields, and the first application executes a function provided by the function field to which the selected at least one data item was moved. Furthermore, at least one of the region where the first application is displayed or the region where the data list is displayed is movable on the touch screen. Additionally, the data list is managed by a second application different from the first application. Finally, a plurality of data lists are respectively displayed in predetermined positions.

In another feature, the first application is a video telephony application for transmitting data to a video telephony recipient. Additionally, the data list comprises at least one of a text, a still image, a moving image, a phone number, or an Internet address.

In yet another feature, the first application is an message transmitting application comprising at least one function for designating a message source or a message destination, a function for inputting a message, or a function for attaching a file. Additionally, the data list comprises at least one of a text, a still image, a moving image, a phone number, or an Internet address.

In still yet another feature, the first application is a web browsing application and comprises at least one function for a web search or a function for inputting an Internet addresses. Additionally, the data list comprises at least one of a text or an Internet address.

In accordance with an embodiment a mobile terminal with a touch screen is presented. The mobile terminal includes a touch screen, a memory storing at least one application and at least one data list including at least one data item, and a controller simultaneously displaying a first application and the data list in predetermined positions on the touch screen and using at least one data item selected from the data list to execute a function provided by the first application when the selected at least one data item is moved to the region where the first application is displayed.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures, wherein.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification may include a cellular phone, a smart phone, a laptop computer, a digital broadcasting terminal, personal digital assistants (PDA), a portable multimedia player (PMP), or a navigation system.

Figure 1:
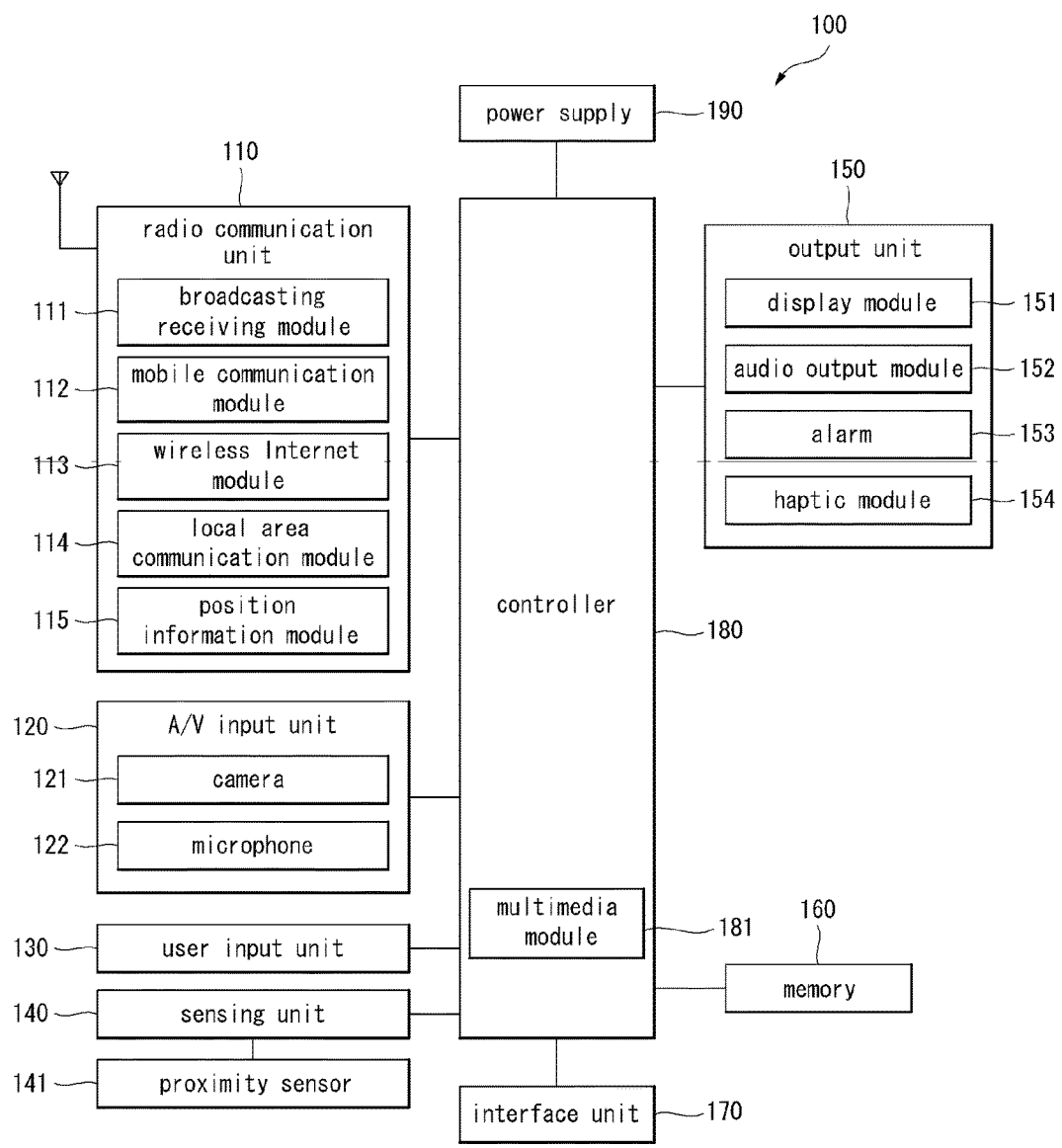
FIG. 1 is a block diagram of a mobile terminal according to an embodiment of the present invention.

FIG. 1 illustrates a block diagram of a mobile terminal 100 according to an embodiment of the present invention. The mobile terminal 100 may include a radio communication unit 110, an audio/video (A/V) input unit 120, a user input unit 130, a sensing unit 140, an output unit 150, a memory 160, an interface unit 170, a controller 180, and a power supply 190. The components illustrated in FIG. 1 are not essential parts and the number of components included in the mobile terminal may vary.

The components of the mobile terminal will now be described in detail.

The radio communication unit 110 may include at least one module that enables radio communication between the mobile terminal 100 and a radio communication system, or between the mobile terminal 100 and a network in which the mobile terminal 100 is located. For example, the radio communication unit 110 may include a broadcasting receiving module 111, a mobile communication module 112, a wireless Internet module 113, a local area communication module 114, and a position information module 115.

The broadcast receiving module 111 receives a broadcast signal and broadcast associated information from an external broadcast managing entity via a broadcast channel.

The broadcast channel may include a satellite channel or a terrestrial channel. The broadcast managing entity may be a system which transmits a broadcast signal or broadcast associated information.

Examples of broadcast associated information include information associated with a broadcast channel, a broadcast program, or a broadcast service provider. For example, broadcast associated information may include an electronic program guide (EPG) of digital multimedia broadcasting (DMB) or electronic service guide (ESG) of digital video broadcast-handheld (DVB-H). In this example, the broadcasting related information may be received by the mobile communication module 112.

The broadcast receiving module 111 may receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®), and integrated services digital broadcast-terrestrial (ISDB-T).

The broadcast receiving module 111 may also receive multicast signals. Data received by the broadcast receiving module 111 may be stored in a suitable device, such as the memory 160.

The mobile communication module 112 transmits and receives wireless signals to and from one or more network entities, such as a base station or a Node-B. The wireless signals may represent audio, video, multimedia, control signaling, or data.

The wireless Internet module 113 provides Internet access for the terminal 100. The wireless Internet module 113 may be internally or externally coupled to the terminal 100. The wireless Internet techniques may include, but are not limited to, Wireless LAN (WLAN) (Wi-Fi), wireless broadband (Wibro), world interoperability for microwave access (Wimax), and high speed downlink packet access (HSDPA).

The local area communication module 114 facilitates short-range communications. Suitable technologies for implementing the local area communication module 114 include radio frequency identification (RFID), infrared data association (IrDA), ultra-wideband (UWB), as well at the networking technologies commonly referred to as Bluetooth™ and ZigBee™.

The position information module 115 identifies and obtains the location of the terminal 100. The position information module 115 may be implemented using global positioning system (GPS) components which cooperate with associated satellites and network components.

The audio/video (A/V) input unit 120 provides audio or video signal inputs to the terminal 100. The A/V input unit 120 may include a camera 121 and a microphone 122. The camera 121 receives and processes image frames of still pictures or video. The processed image frames or video may be displayed on a display unit 151.

The microphone 122 receives an external audio signal while the terminal 100 is in a particular mode, such as a phone call mode, a recording mode, or a voice recognition mode. The audio signal is processed and converted into digital data. The terminal 100 and A/V input unit 120 may include assorted noise removing algorithms to remove noise generated in the course of receiving the external audio signal.

Data generated by the A/V input unit 120 may be stored in the memory 160, utilized by the output unit 150, or transmitted via one or more modules of communication unit 110. The terminal 100 may include two or more microphones 122 or cameras 121.

The user input unit 130 generates input data in response to user manipulation of an associated input device or devices. Examples of such devices include a keypad, a dome switch, a touchpad, a jog wheel, and a jog switch.

The sensing unit 140 provides status measurements for various aspects of the terminal 100. For example, the sensing unit may detect an open and close state of the terminal 100, relative positioning of components of the terminal, a change of position of the terminal, a change of position of a component of the terminal, a presence or absence of user contact with the terminal, orientation of the terminal, or acceleration or deceleration of the terminal. The sensing unit 140 may also sense the presence or absence of power provided by the power supply 190 and the presence or absence of a connection between the interface unit 170 and an external device. The sensing unit 140 may also include a proximity sensor.

The interface unit 170 may act as a passage for supplying the mobile terminal 100 with a power from a cradle or delivering various command signals input from the cradle if the mobile terminal 110 is connected to an external cradle. Each of the various command signals input from the cradle or the power may operate as a signal enabling the mobile terminal 100 to recognize that it is correctly loaded in the cradle.

The output unit 150 outputs information associated with the terminal 100. The display 151 is typically implemented to display information associated with the terminal 100. For example, the display 151 may provide a graphical user interface which includes information associated with a phone call if the terminal is operating in a phone call mode. The display 151 may display images which are associated with various modes, such as a video call mode or a photographing mode.

The display 151 may be configured as a touch screen working in cooperation with the input unit 130, in one embodiment of the present invention. This configuration allows the display 151 to function both as an output device and an input device. The touch screen may be in the form of a touch film, a touch sheet and a touch pad, for example.

The display 151 may be implemented using known display technologies such as a liquid crystal display (LCD), a thin film transistor-liquid crystal display (TFT-LCD), an organic light-emitting diode display (OLED), a flexible display, or a three-dimensional display.

The display unit may be of a transparent type or a light transmission type. The transparent display includes a transparent liquid crystal display. The rear structure of the display unit 151 may also be of the light transmission type. According to this structure, a user may see an object located behind the body of the mobile terminal 100 through an area of the body of the mobile terminal 100, which is occupied by the display unit 151.

The terminal 100 may include one or more displays 151. An example of a two-display embodiment is one in which one display 151 is configured as an internal display which is viewable when the terminal 100 is in an opened position and a second display configured as an external display which is viewable in both the open and closed positions.

The touch sensor may be constructed such that it converts a variation in pressure applied to a specific area of the display unit 151 or a variation in capacitance generated at a specific area of the display unit 151 into an electric input signal. The touch sensor may sense the pressure of a touch in addition to the position and area of a touch.

When an input is applied to the touch screen, a signal corresponding to the input is transmitted to a touch controller. The touch controller processes the signal and transmits data corresponding to the processed signal to the controller 180. Accordingly, the controller 180 may detect a touched area of the display 151.

The proximity sensor 141 may be provided within or around the touchscreen. The proximity sensor detects an object approaching a prescribed detecting surface or a presence or non-presence of an object existing around itself using an electromagnetic power or infrared rays without mechanical contact.

The proximity sensor may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, or an infrared proximity sensor.

A capacitive touch screen may be constructed such that proximity of a pointer may be detected via a variation in an electric field according to the proximity of the pointer. In this example, the touch screen may be classified as a proximity sensor.

For clarity and convenience of explanation, an action for enabling the pointer approaching the touchscreen to be recognized as placed on the touchscreen is referred to as a "proximity touch" and an action of enabling the pointer to actually come into contact with the touchscreen is referred to as a "contact touch". A "proximity touch point" refers to a point on the touch screen which the pointer perpendicularly corresponds with the touch screen.

The proximity sensor may sense a proximity touch pattern and a proximity touch action. For example, the proximity sensor may sense a proximity touch distance, a proximity touch direction, a proximity touch velocity, a proximity touch time, a proximity touch position, or a proximity touch moving state. Information associated with the sensed proximity touch action and proximity touch pattern may be displayed on the touch screen.

FIG. 1 further shows the output unit 150 having an audio output module 152. The audio output module 152 may be implemented using one or more speakers, buzzers, or other audio producing devices.

The audio output module 152 functions in various modes including a call-receiving mode, a call-placing mode, a recording mode, a voice recognition mode, or a broadcast reception mode. The audio output module 152 outputs audio relating to a particular function, such as a call notification, a message notification, or a error notification.

The output unit 150 is further shown having an alarm 153, which may be used to output a signal for indicating generation of an event of the mobile terminal 100. Examples of events generated in the mobile terminal include receiving a call signal, receiving of a message, input of a key signal, or input of touch, for example.

The alarm 153 may output signals in forms different from video signals or audio signals, for example, a signal for indicating generation of an event via vibration. The video signals or the audio signals may be output via the display unit 151 or the audio output module 152.

The output unit 150 is further shown having a haptic module 154, which may generate various haptic effects such as a vibration. The haptic module may control the intensity and pattern of the generated vibration. For example, different vibrations may be combined and output or sequentially output.

The haptic module 154 may generate a variety of haptic effects, such as, the feeling of pins contacting a user's skin, a jet force or sucking force, rubbing a user's skin, a user's contact with an electrode, an electrostatic force, or variations in temperature.

The haptic module 154 may also allow a user to feel haptic effects via kinesthetic sense of the user's fingers or arms. The mobile terminal 100 may include more than one haptic module 154 according to constitution of the mobile terminal.

The memory 160 may store various types of data to support the processing, control, or storage requirements of the terminal 100. Examples of such data include program instructions for applications operating on the terminal, contact data, phonebook data, messages, pictures, or video.

The memory 160 shown in FIG. 1 may be implemented using any type of volatile and non-volatile memory or storage devices. Such devices may include random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device. The mobile terminal 100 may operate in relation to a web storage performing the storing function of the memory 160 on the Internet.

The interface unit 170 may be implemented to connect the terminal with an external device. External devices include wired and wireless headphones, external chargers, power supplies, storage devices configured to store data, or microphones. The interface unit 170 may be configured using a wired and wireless data port, a memory card socket, audio input and output ports (I/O), or video I/O ports. Additionally, the interface unit 170 may act as a passage for supplying the mobile terminal 100 with a power supply.

The interface unit 170 may also receive a user identification module (UIM). A UIM may include a chip that stores information for authenticating the authority to use the mobile terminal 100 and may include a subscriber identity module (SIM) and a universal subscriber identity module (USIM). A user identification module may be manufactured in the form of a smart card.

The controller 180 controls the overall operations of the terminal 100. For example, the controller 180 performs the control and processing associated with voice calls, data communications, video calls, camera operations, and recording operations.

The controller 180 may include a multimedia module 181 which provides multimedia playback. The multimedia module 181 may be configured as part of the controller 180 or may be implemented as a separate component.

Moreover, the controller 180 is able to perform a pattern recognizing process for recognizing a writing input and a picture drawing input carried out on the touchscreen as characters or images.

The power supply 190 provides power to the various components of the terminal 100. The power provided may be internal power or external power.

Various embodiments described herein may be implemented in a computer-readable medium using computer software. The various embodiments may also be implemented in hardware.

A hardware implementation may be implemented using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein. Some embodiments are implemented by controller 180.

A software implementation of the embodiments described herein may be implemented with separate software modules, such as procedures and functions, each of which perform one or more of the functions and operations described herein. The software code may be implemented with a software application written in any suitable programming language and may be stored in the memory 160 for execution by the controller 180 or a processor.

Figure 2A:
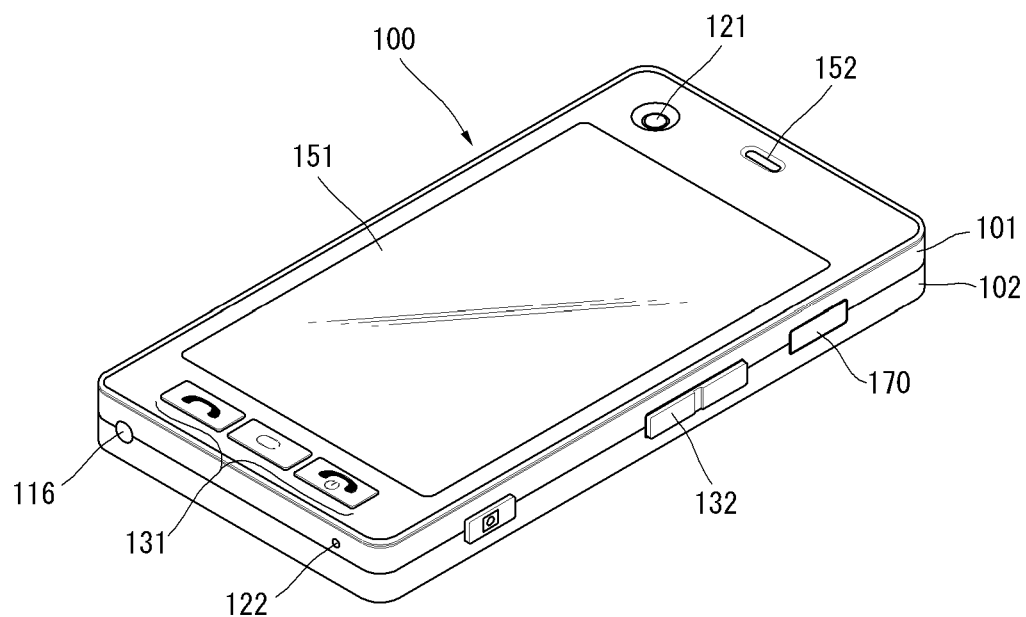
FIG. 2A is a front perspective view of a handheld terminal according to an embodiment of the present invention.

FIG. 2A illustrates a perspective view of a terminal 100 according to an embodiment of the present invention.

The terminal 100 may be implemented in a variety of different configurations. Examples of such configurations include folder-type, slide-type, bar-type, rotational-type, swing-type, and swivel-type terminals comprising at least two bodies that are relatively movably combined.

The terminal body includes a case, such as, a housing or a cover, forming the exterior of the terminal 100. In the present embodiment, the case may be divided into a front case 101 and a rear case 102. Various electronic components are arranged in the space formed between the front case 101 and the rear case 102. At least one middle case (not shown) may be additionally arranged between the front case 101 and the rear case 102.

The cases may be formed of plastics via injection molding or made of a metal material such as stainless steel (STS) or titanium (Ti).

The display unit 151, the audio output unit 152, the camera 121, the user input unit 130 (not shown), 131, and 132, the microphone 122, and the interface 170 may be arranged in the terminal body, specifically, in the front case 101.

The display unit 151 may be placed on the front case 101. The audio output unit 152 and the camera 121 may be placed in proximity to one end of the display unit 151, the user input unit 131 and the microphone 122 may be located at the end of the display unit 151 which is opposite to the audio output unit 152. The user input unit 132 and the interface unit 170 may be arranged on the sides of the front case 101 and the rear case 102.

The user input unit 130 may receive commands for controlling the operation of the handheld terminal 100 and may include a plurality of input units 131 and 132. A user may operate the input units 131 and 132 while having tactile feeling.

Input units 131 and 132 may receive various inputs. For example, the input unit 131 may receive commands such as start, stop, and scroll and the input unit 132 may receive commands for controlling the volume of a sound output from the audio output unit 152 or conversion of the display unit 151 to a touch recognition mode, for example.

Figure 2B:
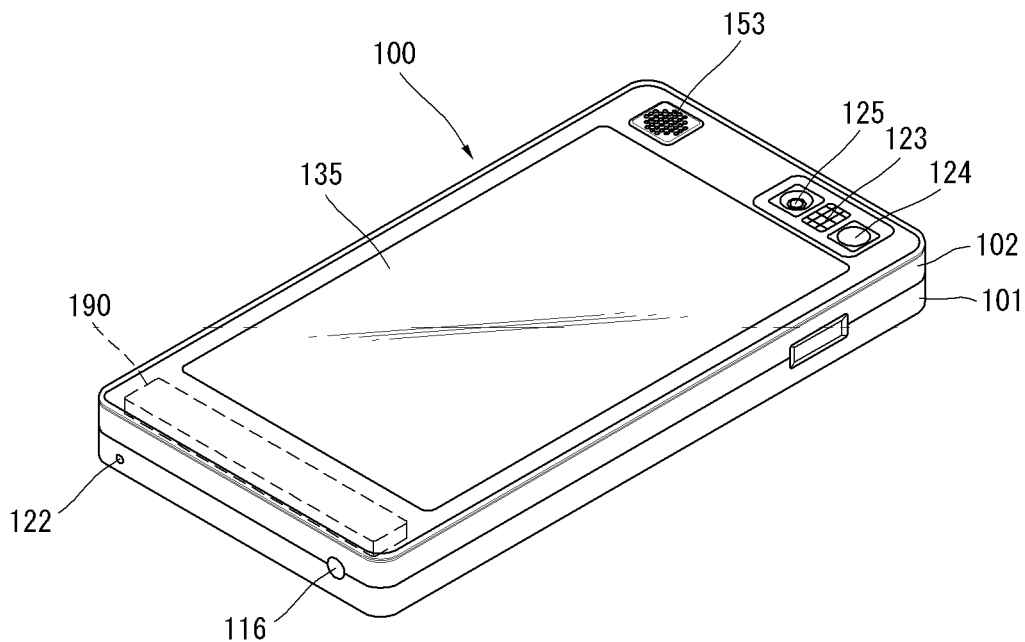
FIG. 2B is a rear perspective view of the handheld terminal shown in FIG. 2A according to an embodiment of the present invention.

FIG. 2B illustrates a rear perspective view of the handheld terminal shown in FIG. 2A according to an embodiment of the present invention.

As illustrated in FIG. 2A, a camera 125 may be additionally attached to the rear case 102. The camera 125 has a photographing direction opposite to that of the camera 121. The camera 121 of the front case 101 and camera 125 of the rear case 102 may have the same or different capabilities.

For example, the camera 121 may operate with a relatively lower resolution than the camera 125. Such an arrangement works well during a video conference in which reverse link bandwidth capabilities may be limited. The relatively higher resolution of the camera 125 of the rear case 102 is useful for obtaining higher quality pictures. The cameras 121 and 125 may be attached to the terminal body such that they may be rotated or popped-up.

A flash bulb 123 and a mirror 124 are additionally arranged in proximity to the camera 125. The flash bulb 123 may illuminate an object when the camera 125 takes a picture of the object. The mirror 124 is useful for assisting a user to position the camera 125 in a self-portrait mode.

The rear case 102 also includes an audio output module 153 configured as a speaker. The audio output module 152 of the front case 101 and the audio output module 153 of rear case 102 may cooperate to provide stereo output. Moreover, either or both of the audio output modules 152 and 153 may be configured to operate as a speakerphone.

A broadcasting signal receiving antenna 116 may be additionally attached to the side of the terminal body in addition to an antenna for telephone calls. The antenna 116 functions in cooperation with the broadcast receiving module 111. The antenna 116 may be fixed or configured to retract into the rear case 102.

The power supply 190 provides power to the terminal 100. The power supply 190 may be detachably mounted to the terminal.

A touch pad 135 may be additionally attached to the rear case 102. The touch pad 135 may be of a light transmission type similar to the display unit 151. For example, the touch pad 135 may simultaneously output information displayed on the display unit 151. Additionally, the information output via both sides of the display unit 151 may be controlled via the touch pad 135. Additionally, the touch pad 135 may display information which is different from the information displayed on the display unit 151.

The touch pad 135 may operate in connection with the display unit 151 of the front case 101. Additionally, the touch pad 135 may also be located in parallel with the display unit 151 or behind the display unit 151. Finally, the size of the touch panel 135 may be identical to or smaller than the display unit 151.

Figure 3A:
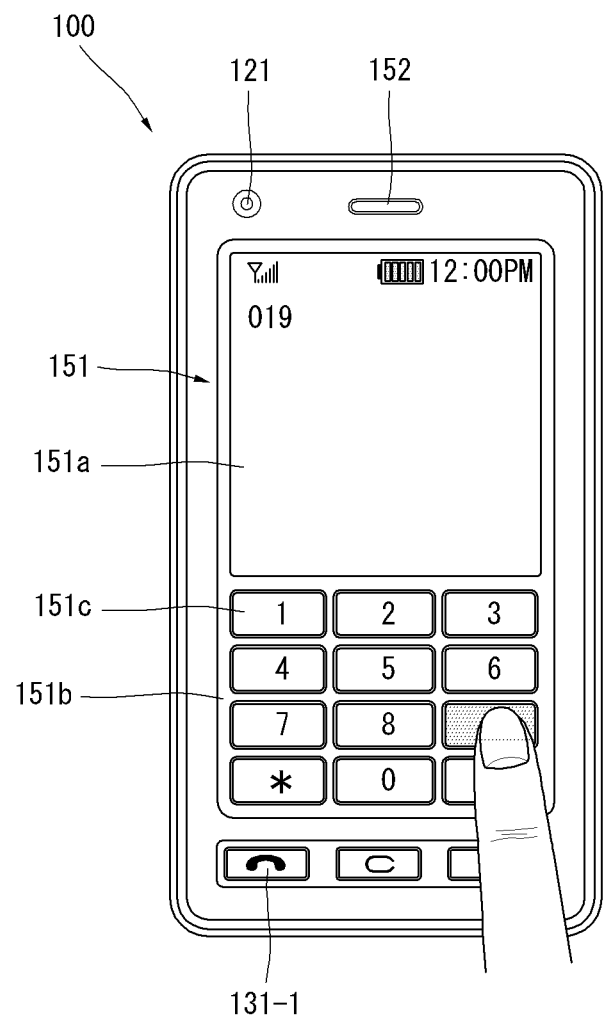
FIGS. 3A and 3B are front views of a handheld terminal for explaining an operation of the handheld terminal according to an embodiment of the present invention.
Figure 3B:
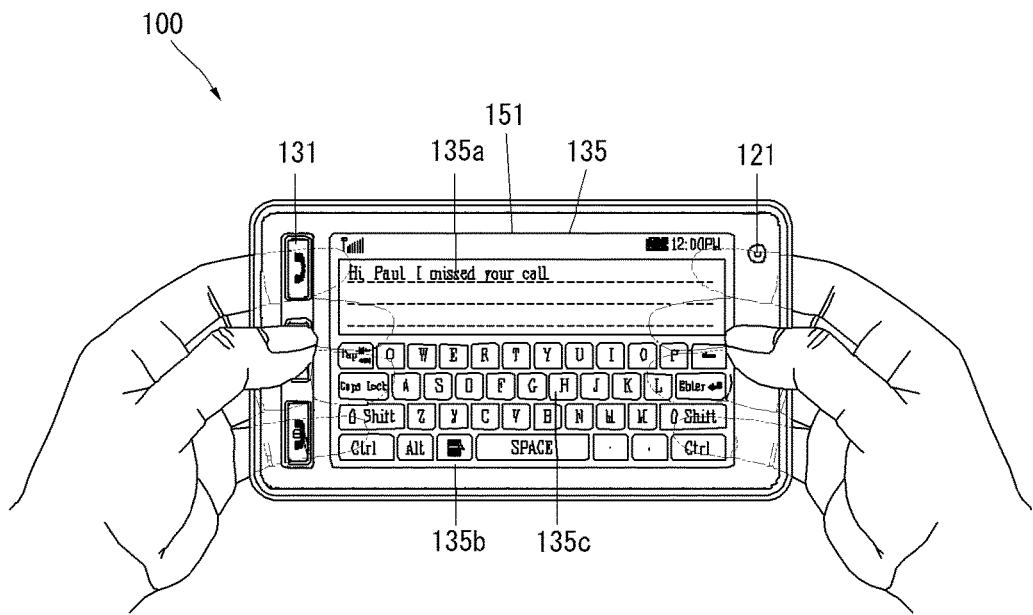

The operations of the display unit 151 and the touch pad 135 will now be described with reference to FIGS. 3A and 3B. FIGS. 3A and 3B illustrate front views of the terminal 100 according to an embodiment of the present invention.

The display unit 151 may display various types of visual information in the form of characters, numerals, symbols, graphics, or icons. At least one of the characters, numerals, symbols, graphic, or icons may be displayed in a predetermined arrangement, such as a keypad. The keypad displayed on the display unit 151 may be referred to as a "soft key".

FIG. 3A illustrates that touch applied to a soft key is input via the front side of the terminal body. The display unit 151 may be operated via the entire display area. Alternatively, the display unit 151 may be divided into a plurality of regions. Additionally, the display unit 151 may be constructed such that the plurality of regions interoperate.

For example, an output window 151*a* and an input window 151*b* may be, respectively, displayed in upper and lower parts of the display unit 151. The input window 151*b* may display soft keys 151*c* that represent numerals used to input numbers such as telephone numbers. A numeral corresponding to the touched soft key is displayed on the output window 151*a* when a soft key 151*c* is touched. Additionally, a connection for a call corresponding to a telephone number displayed on the output window 151*a* is attempted when the user operates the input unit 131-1.

FIG. 3B illustrates a user input via the touch pad 135 located on the rear side of the terminal body. FIG. 3B illustrates a landscape orientation of the terminal body while FIG. 3A illustrates a portrait orientation of the terminal body. The display unit 151 may be constructed such that an output image is converted according to the direction in which the terminal body is located.

FIG. 3B illustrates the operation of the handheld terminal in a text input mode. The display unit 151 displays an output window 135*a* and an input window 135*b*. A plurality of soft keys 135*c* may display at least one of characters, symbols, and numerals. The soft keys 135*c* may be displayed in the input window 135*b*. The soft keys 135*c* may be arranged in the form of "QWERTY" keys.

Characters, numerals, and symbols corresponding to the touched soft keys 135*c* are displayed on the output window 135*a* when soft keys 135*c* are touched via the touch pad 135. Touch input via the touch pad 135 allows for the soft keys 135*c* to have a greater visibility as compared to touch input via the display unit 151. For example, objects located behind the terminal body may be viewed with the naked eye, and thus touch input may be performed more correctly when the display unit 151 and the touch pad 135 are transparent.

The display unit 151 or the touch pad 135 may be constructed such that touch input may be received via a scroll input. The user may scroll the display unit 151 or the touch pad 135 to move an object displayed on the display unit 151, for example, a cursor or a pointer located on an icon. Furthermore, the finger moving path may be visually displayed on the display unit 151 when a finger moves on the display unit 151 or the touch pad 135.

A specific function of the terminal may be executed if the display unit 151 and the touch pad 135 are simultaneously touched for a predetermined period of time. The specific function may include activation or inactivation of the display unit 151 or the touch pad 135, for example.

Figure 4:
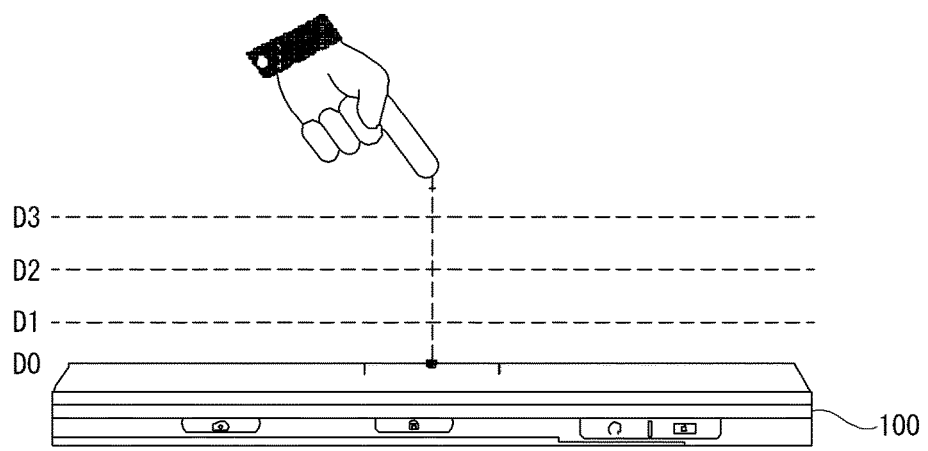
FIG. 4 illustrates an example of a proximity depth of a proximity sensor.

The proximity sensor described with reference to FIG. 1 will now be explained in more detail with reference to FIG. 4. FIG. 4 illustrates a conceptual view for a proximity depth of the proximity sensor.

As shown in FIG. 4, when a pointer such as a user's finger approaches the touch screen, the proximity sensor senses the approach and may output a proximity signal.

The proximity sensor may be constructed such that it outputs a proximity signal according to the distance between the pointer approaching the touch screen and the touch screen (referred to as "proximity depth").

The distance in which the proximity signal is output when the pointer approaches the touch screen is referred to as a detection distance. The proximity depth may be known by using a plurality of proximity sensors having different detection distances and comparing proximity signals respectively output from the proximity sensors.

FIG. 4 shows the section of the touch screen in which proximity sensors may sense three proximity depths. Proximity sensors may be capable of sensing various levels of proximity depths, such as less than three or greater than four.

Specifically, a pointer is recognized as a contact touch when the pointer comes into contact with the touch screen (D0). The pointer is recognized as a proximity touch of a first proximity depth when the pointer is located within a distance D1 from the touch screen. The pointer is recognized as a proximity touch of a second proximity depth when the pointer is located in a range between the distance D1 and a distance D2 from the touch screen, The pointer is recognized as a proximity touch of a third proximity depth when the pointer is located in a range between the distance D2 and a distance D3 from the touch screen. The pointer is recognized as a canceled proximity touch when the pointer is located beyond the distance D3 from the touch screen.

Accordingly, the controller 180 may recognize the proximity touch as various input signals according to the proximity distance and the proximity position of the pointer with respect to the touch screen. The controller 180 may perform various operation controls according to the input signals.

Embodiments of the prevent invention will now be explained. For convenience of explanation it is assumed that the display unit 151 is a touch screen in the present invention. Furthermore, a touch includes both a proximity touch and direct touch.

Figure 5:
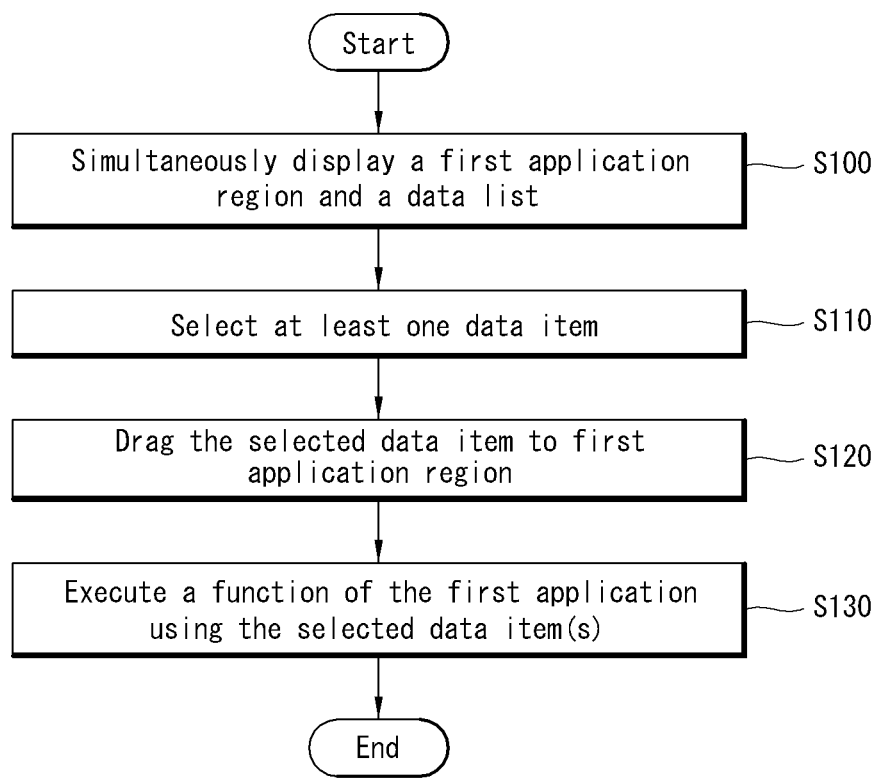
FIG. 5 illustrates a flow chart of a method of processing data in a mobile terminal with a touch screen according to a first embodiment of the present invention.
Figure 6:
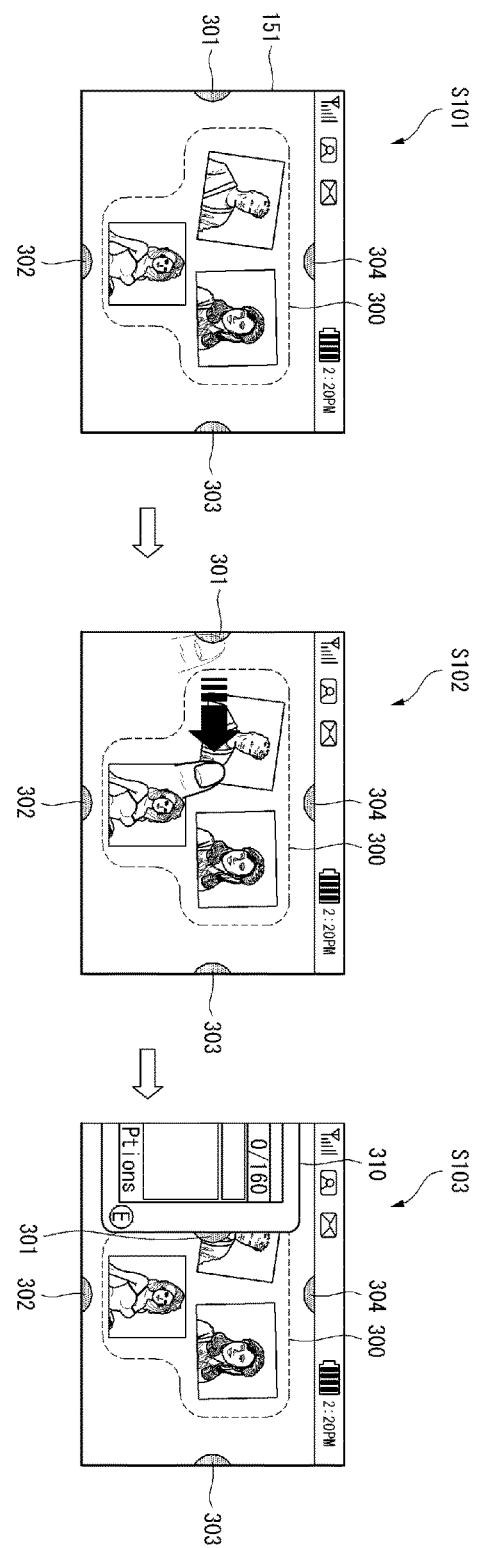
FIG. 6 illustrates an example of displaying an application region with a data list according to the first embodiment of the present invention.

FIG. 5 illustrates a flow chart of a method of processing data in a mobile terminal with a touch screen according to a first embodiment of the present invention. FIG. 6 illustrates an example of displaying an application region with a data list according to the first embodiment of the present invention. The method of processing data in a mobile terminal with a touch screen and the operation of the mobile terminal for achieving the method according to the first embodiment of the present invention will now be explained in detail with reference to FIGS. 1, 5, and 6.

The controller 180 displays a first application with a data list in predetermined regions on the display unit 151 (S100).

The data list may comprise a list of at least one of text, still images, and moving images. For example, the data list may relate to texts having the same attribute. Furthermore, the data list may relate to still images and moving images having at least two attributes. Additionally, the text of the data list may include an Internet address of a specific web site, such as, a uniform resource locator (URL).

A plurality of different data lists may be displayed. For example, a data list with respect to still images and a data list with respect to moving images may be simultaneously displayed on the display unit 151. The different data lists may be, respectively, displayed in predetermined positions.

As illustrated in FIG. 6, the display unit 151 displays a phonebook contact list 300 (S101). Reference numerals 301, 302, 303 and 304 respectively denote icons representing different applications. These applications may be referred to as "first applications." For example, icon 301 may represent a messaging application for transmitting and receiving SMS or MMS messages. Accordingly, if a user touches and drags the icon 301 toward the center of the screen (S102), a messaging application 310 is scrolled and displayed on the display unit 151 (S103). The user may touch and drag the icon 301 to move the messaging application 310 to a desired position.

Examples of the first application include a video telephony application, a messaging application for transmitting and receiving messages, or a web browsing application.

The region in which the first application is displayed may include a plurality of function regions for, respectively, providing different functions. For example, the region in which the messaging application is displayed may include at least one of a source input field for designating a source of the message, a destination input field for designating a destination of the message, a message input field for inputting content for the message, and an attachment field for attaching a file to the message.

Referring to FIG. 5, the user may touch and select at least one data item, or a group of data items, in the data list displayed on the display unit 151 (S110). The data list or specific data included in the data list may be moved and displayed on the display unit 151. Furthermore, the data list may be managed by a second application which is different from the first application. For example, the data list may be managed by a second application according to an attribute of the data list. For example, the data list may be managed by a phonebook application, an image application, or a messaging application.

The user may touch the selected data item and move the selected item to the region in which the first application is displayed (S120). Step S120 corresponds to an operation of dragging-and-dropping the selected at least one data item to the first application region. The selected data item may be moved to one of the plurality of function regions if the first application region includes a plurality of function regions.

The controller 180 executes the function of the first application using the selected data item (S130). The controller 180 may execute a function provided by the function region to which the data item is moved to one of the plurality of function regions if the first application region includes the plurality of function regions.

The present invention may be applied to various embodiments according to the type of the first application. The various embodiments of the present invention will now be explained according to the type of the first application.

Figure 7:
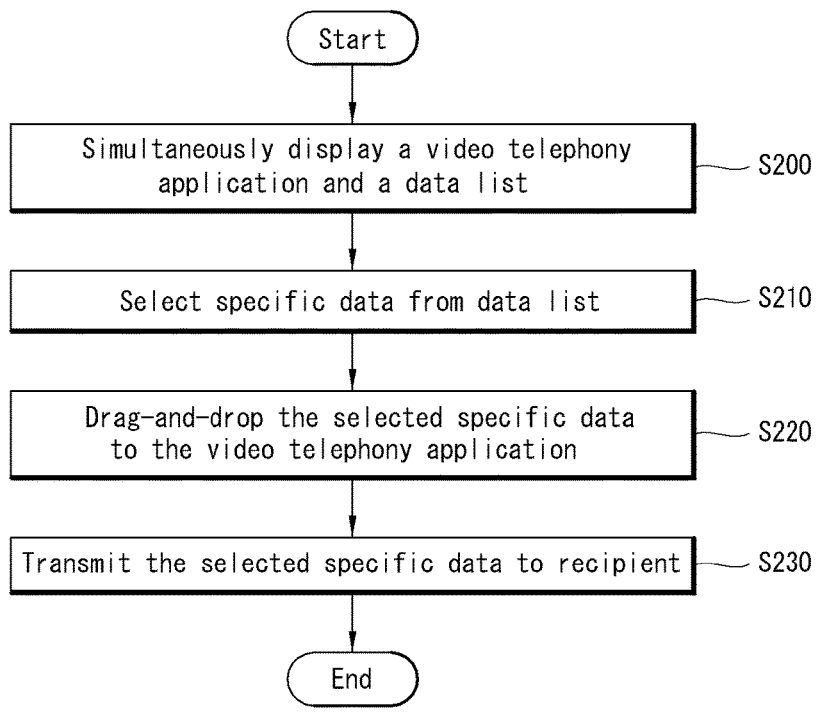
FIG. 7 illustrates a flow chart of a method of processing data in a mobile terminal with a touch screen according to a second embodiment of the present invention.

FIG. 7 illustrates a flow chart for a method of processing data in a mobile terminal with a touch screen according to a second embodiment of the present invention. In the second embodiment of the present invention, the first application corresponds to a video telephony application. FIGS. 8A, 8B, 8C, and 8D illustrate an example to which the present invention is applied in the video telephony application. FIGS. 9A, 9B, 9C, and 9D illustrate another example to which the present invention is applied in the video telephony application. The method of processing data in a mobile terminal according to the second embodiment of the present invention will now be explained in detail with reference to FIGS. 1, 7, 8A through 8D, and 9A through 9D.

The controller 180 may simultaneously display a video telephony application 200 and a data list (S200). A user may select specific data from the data list (S210) and drag-and-drop the selected data to the region in which the video telephony application 200 is displayed (S220). The controller 180 may then transmit the selected data to a video telephony recipient (S230).

Referring to FIGS. 1, 8A, 8B, 8C, and 8D, the controller 180 may simultaneously display the video telephony application 200 and an image list region 210 on the display unit 151 (S200). The image list region 210 displays an image list 211 including a plurality of images 211a, 211b, 211c, and 211d. The image list region 210 may display a scroll bar 212 when all the images included in the image list 211 cannot be simultaneously displayed in the image list region 210. The user may operate the scroll bar 212 to access a desired image.

The region in which the video telephony application 200 is displayed may include a recipient image field 202 displaying an image of a recipient for a video telephony call, a user image field 203 displaying an image of the user of the mobile terminal 100, and an icon field 201 displaying icons 201a, 201b, 201c, 201d representing various functions. The image displayed in the recipient image field 202 may be received from the recipient via the mobile communication module 112 or the wireless Internet module 113, for example. Additionally, the image displayed in the user image field 203 may be obtained via the camera 121.

Figure 8A:
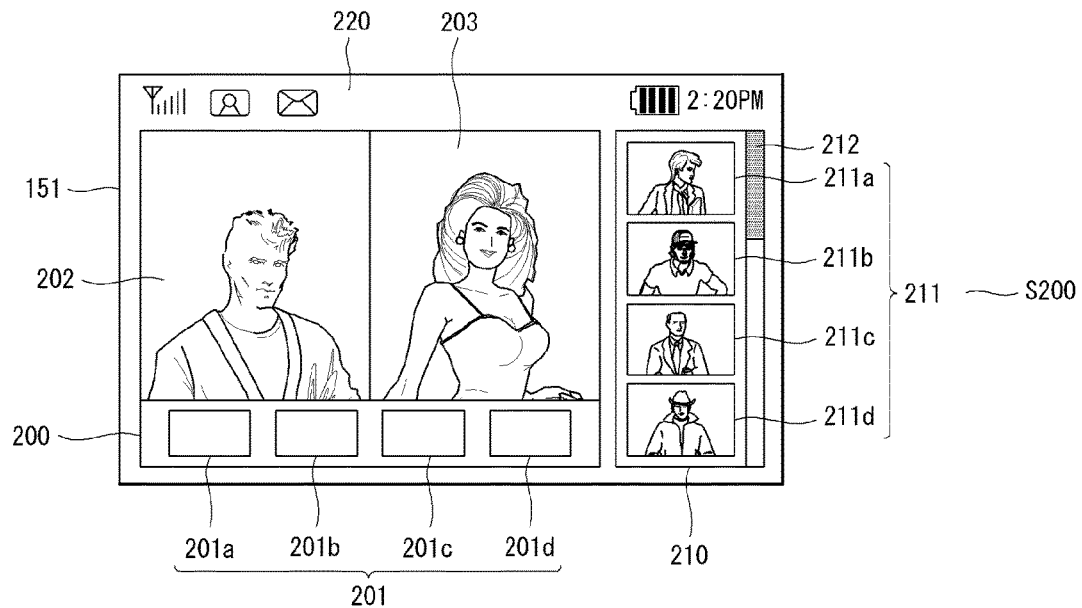
FIGS. 8A, 8B, 8C and 8D illustrate an example to which the present invention is applied in a video telephony application.
Figure 8B:
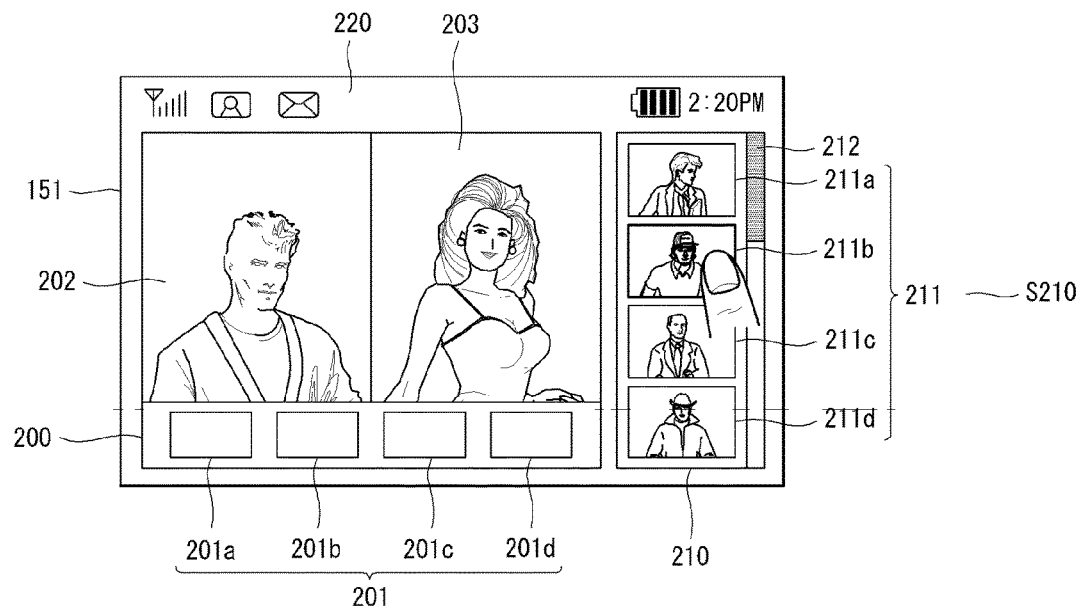
Figure 8C:
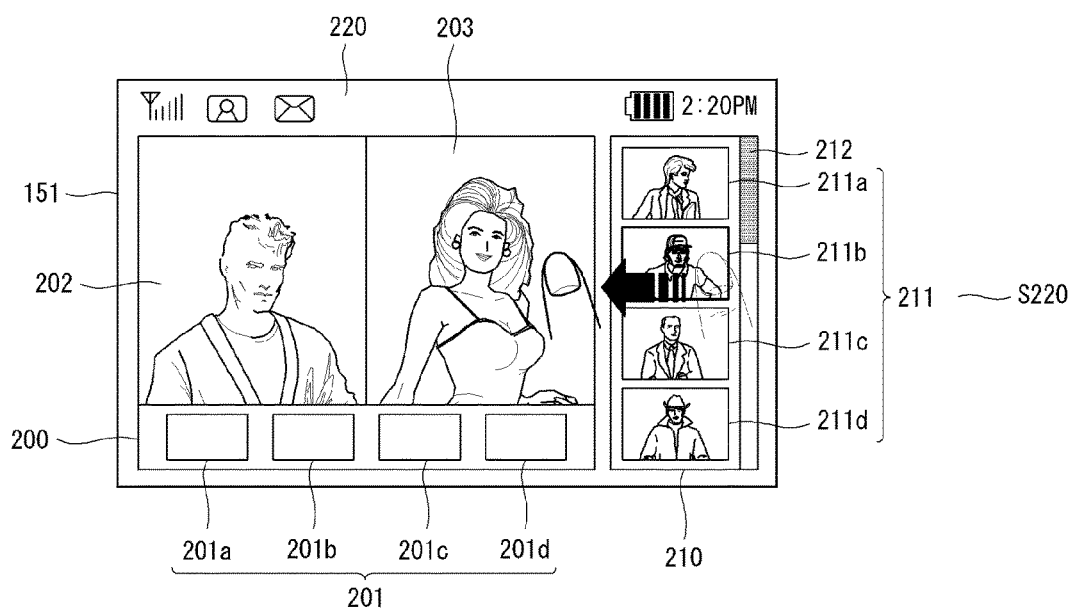

As illustrated in FIG. 8B, a user may touch the image 211b that is intended to be transmitted to a video telephony recipient from the image list 211 (S210). The user may then drag-and-drop the selected image 211b to the user image field 203 (S220), as illustrated in FIG. 8C.

Figure 8D:
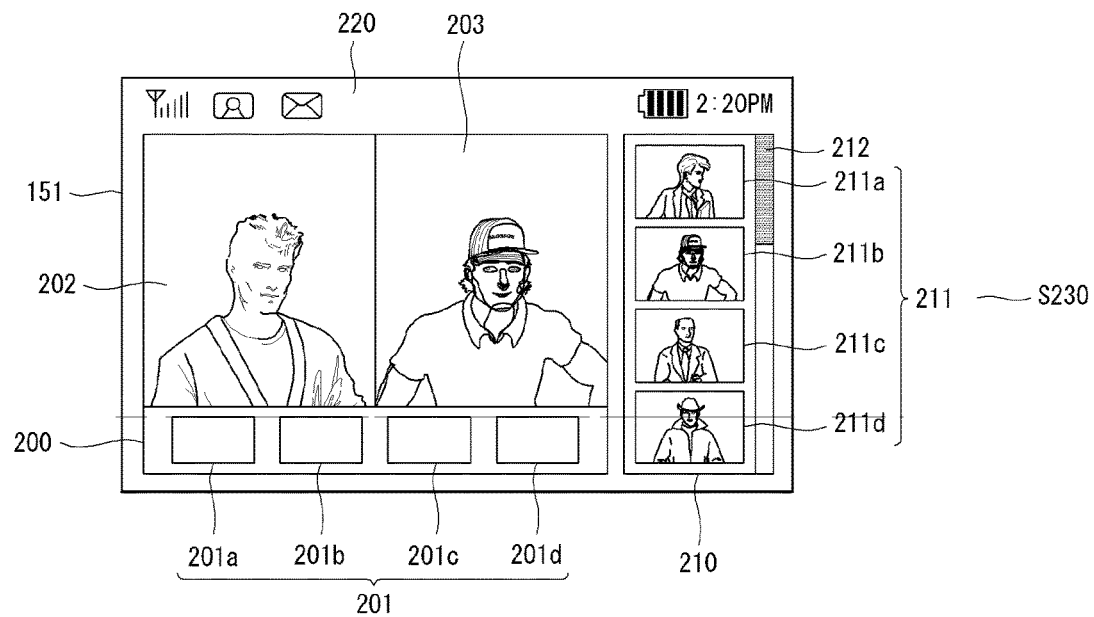

The controller 180 may transmit the selected image 211b to the recipient (S230) after step S220, as illustrated in FIG. 8D. The controller 180 may replace the image of the user, displayed in the user image field 203, with the selected image 211b. Furthermore, the controller 180 may display a message informing the user that the selected image 211b has been transmitted on the display unit 151 while continuously displaying the image of the user in the user image field 203.

Referring to FIGS. 9A, 9B, 9C, and 9D, the controller 180 may simultaneously display the video telephony application 200 and a phonebook 230 in predetermined regions on the display unit 151 (S200). The phonebook 230 displays a phonebook list 231 including a plurality of phonebook data items. The phonebook 230 may display the scroll bar 212. The user may operate the scroll bar 212 to access desired phonebook data.

The user may touch and select the phonebook data that the user wants to transmit to a video telephony recipient from the phonebook list 231 (S210). The user may then drag-and-drop the phonebook data to the user image field 203 (S220).

Figure 9A:
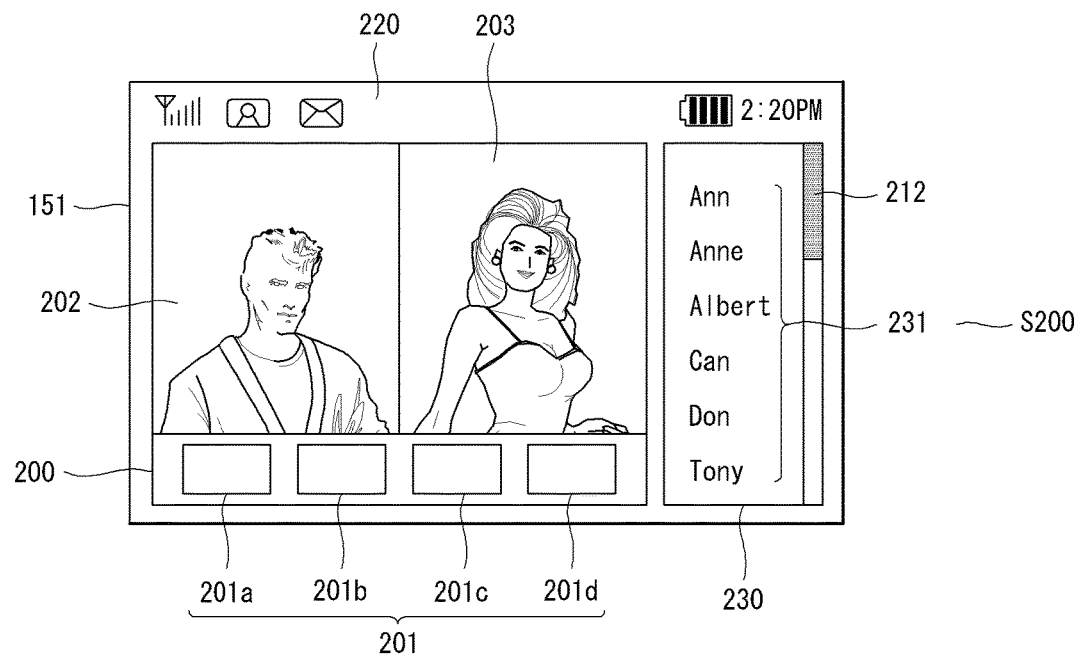
FIGS. 9A, 9B, 9C and 9D illustrate an example to which the present invention is applied in the video telephony application.
Figure 9B:
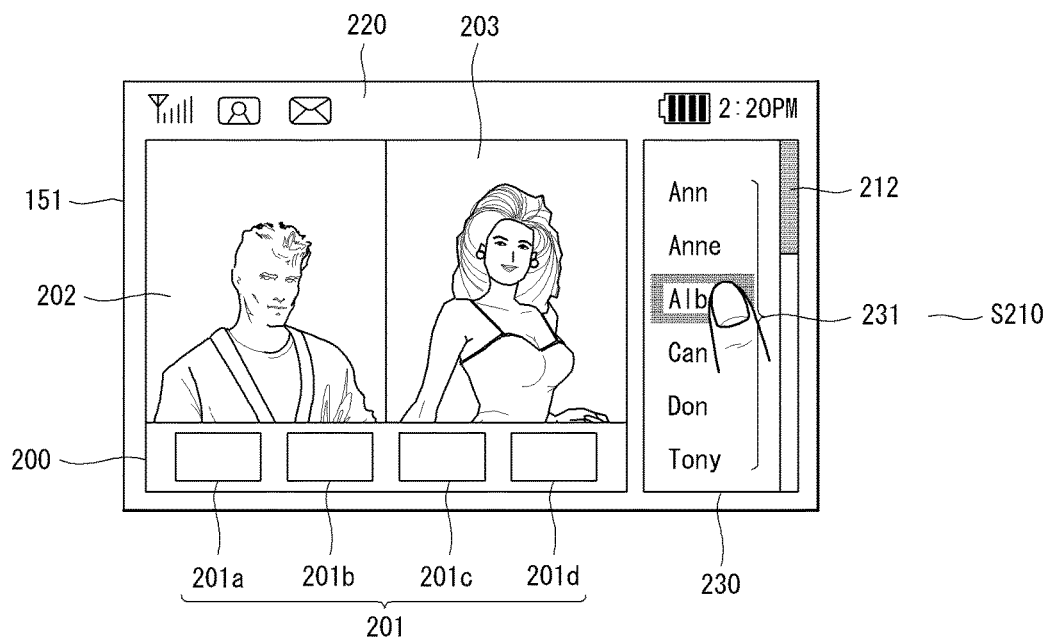
Figure 9C:
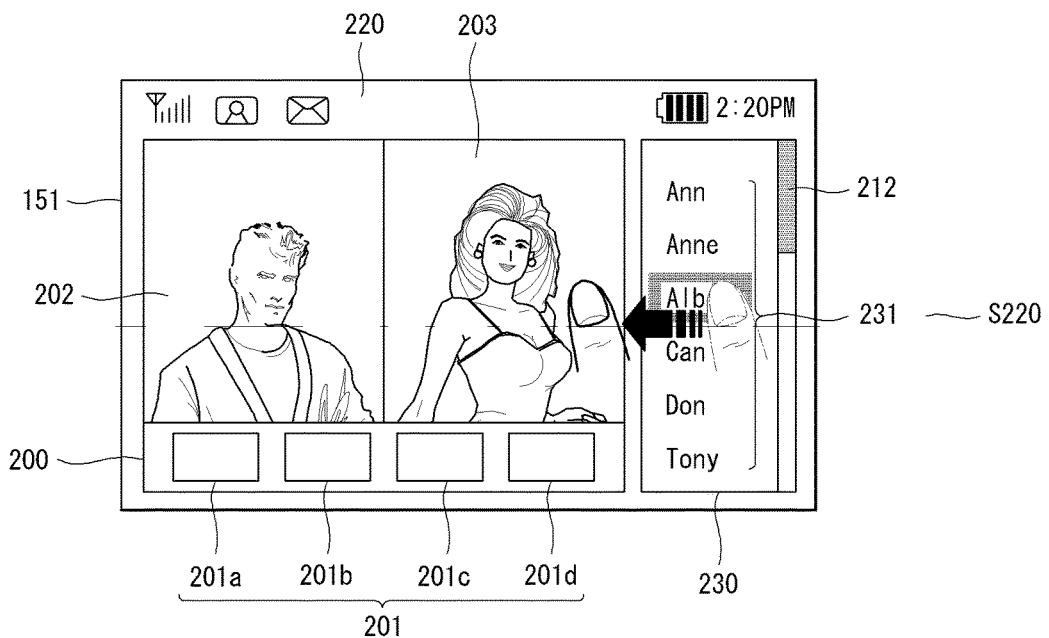
Figure 9D:
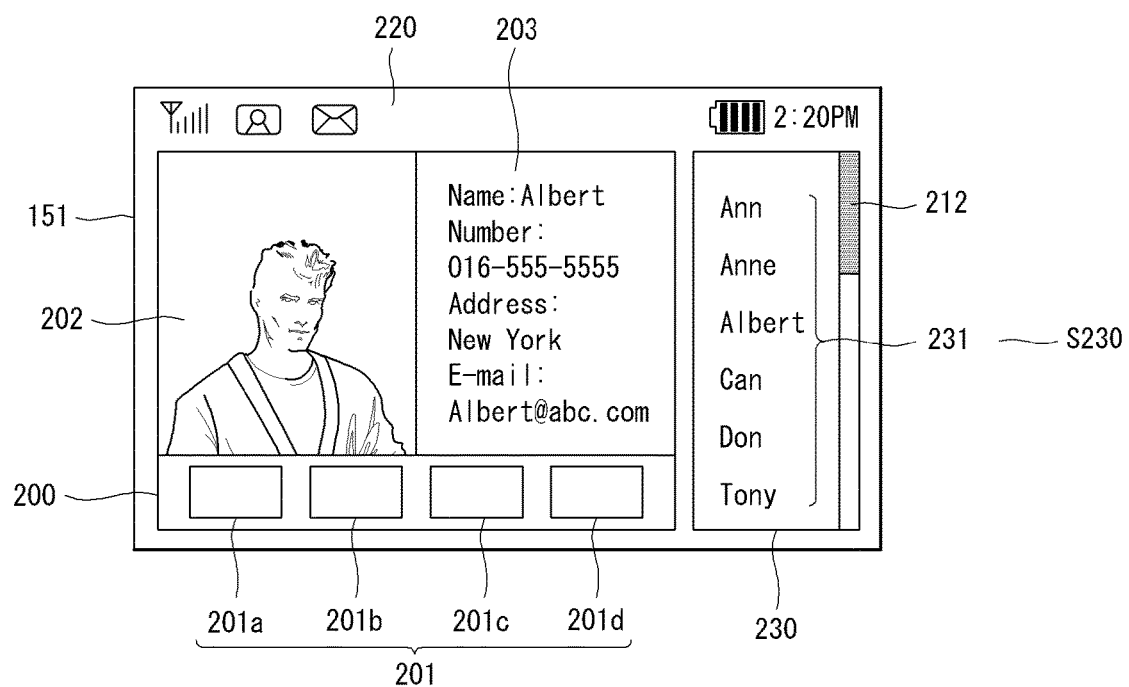

As illustrated in FIGS. 9B and 9C, the user selects phonebook data corresponding to "Albert" and drags-and-drops the phonebook data to the user image field 203. The controller 180 may then transmit the selected phonebook data to the recipient (S230). The controller 180 may replace the user image displayed in the user image field 203 with the selected phonebook data, as shown in FIG. 9D. Furthermore, the controller 180 may display a message informing the user that the selected phonebook data has been transmitted to the recipient on the display unit 151 while continuously displaying the image of the user in the user image field 203.

Figure 10:
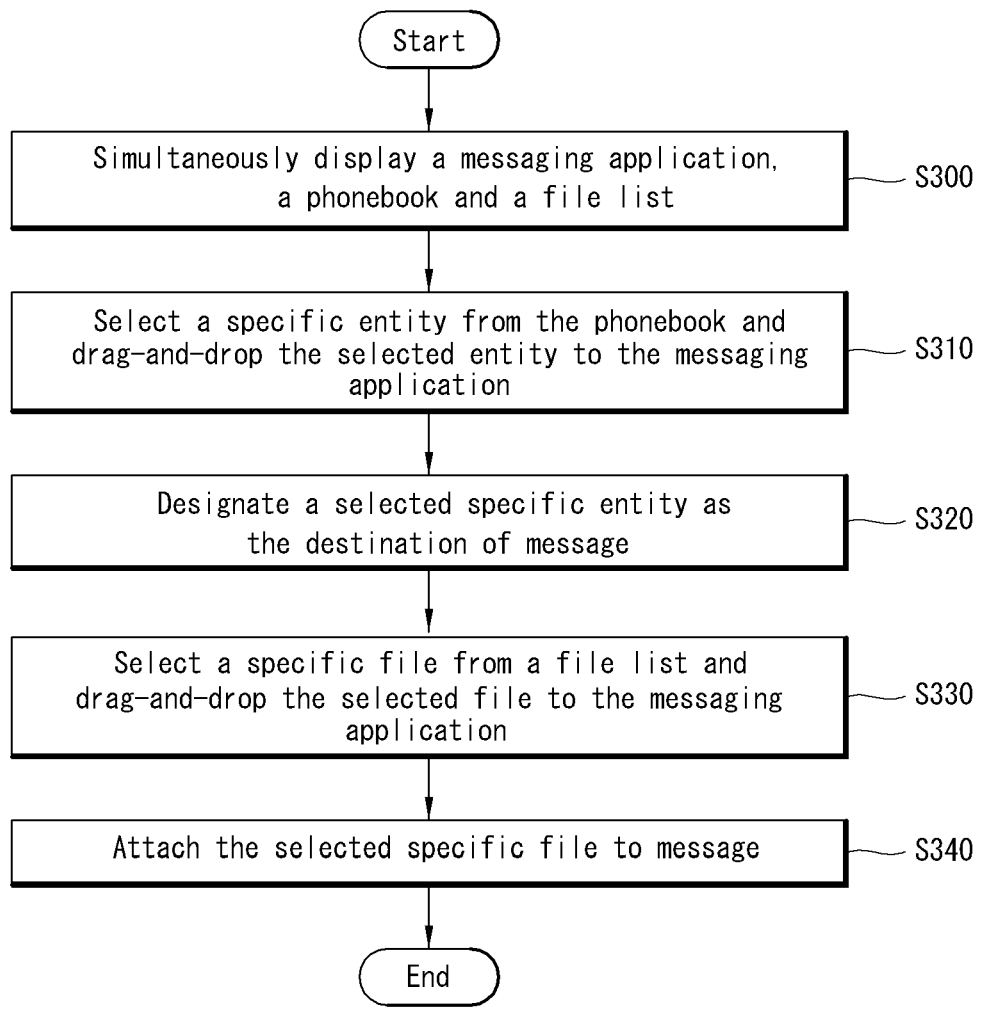
FIG. 10 illustrates a flow chart of a method of processing data in a mobile terminal with a touch screen according to a third embodiment of the present invention.

FIG. 10 illustrates a flow chart for a method of processing data in a mobile terminal with a touch screen according to a third embodiment of the present invention. In the third embodiment of the present invention, the first application is associated with a messaging application. FIGS. 11A through 11E illustrate an example to which the present invention is applied in the messaging application. The method of processing data in a mobile terminal according to the third embodiment of the present invention will now be explained in detail with reference to FIGS. 1, 10, and 11A through 11E.

Figure 11A:
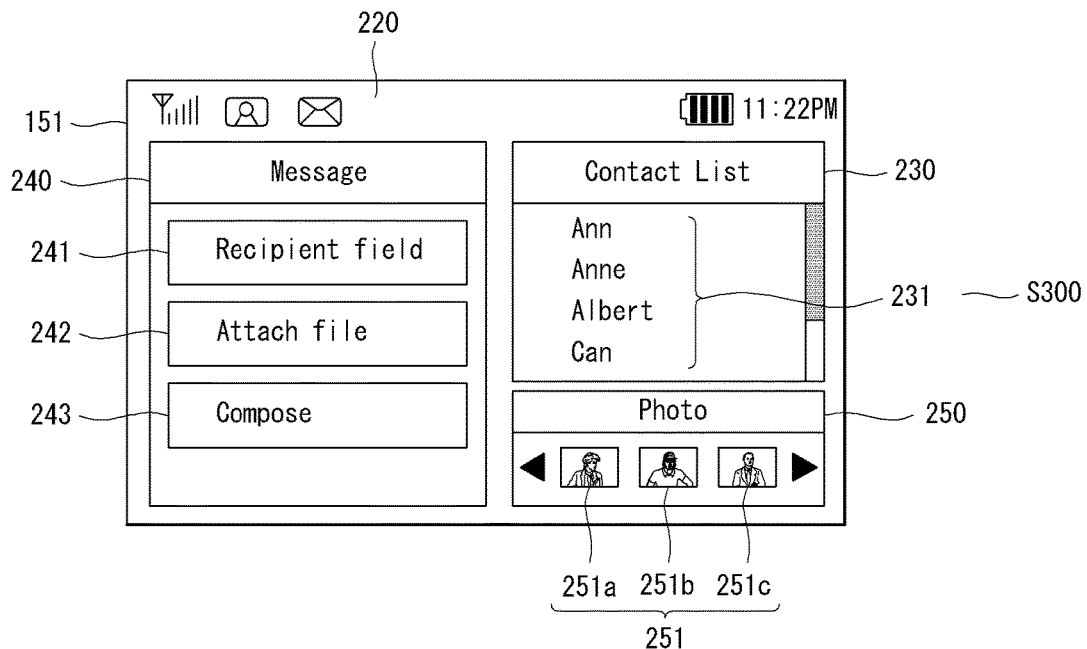
FIGS. 11A through 11E illustrate an example to which the present invention is applied in a messaging application.

The controller 180 simultaneously displays a messaging application 240, a phonebook 230, and a file list 250 in predetermined regions on the display unit 151 (S300). The region in which the messaging application 240 is displayed includes a destination field 241, an attachment file field 242 and a message composition field 243. Furthermore, the display unit 151 displays the phonebook 230 including a phonebook list 231. The file list 250 may include various files. For example, as illustrated in FIG. 11A, a picture list may be used as the file list 250.

Figure 11B:
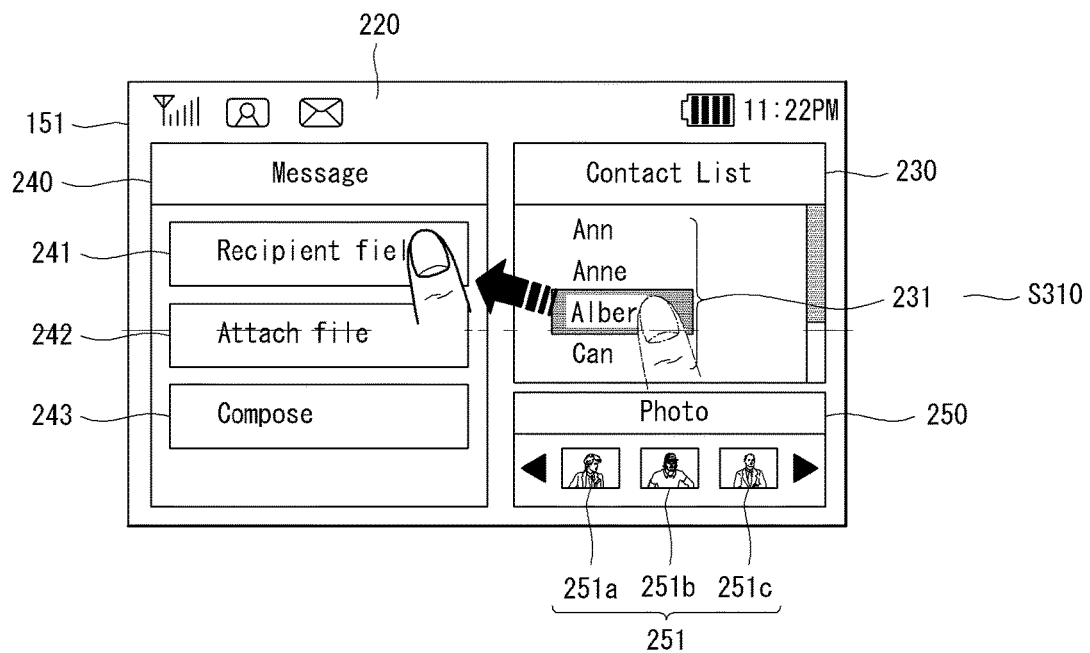

A user selects a specific item from the phonebook 230 and drags-and-drops the selected specific item to the messaging application region 240 (S310). For example, as illustrated in FIG. 11B, the user may touch and select "Albert" and then drag-and-drop "Albert" to the messaging application region 240. The user may drag-and-drop the specific item to a predetermined point in the messaging application region 240 or a point included in a region to which the specific item may be input.

For example, the controller 180 may check an attribute of the specific item dragged-and-dropped to the messaging application region 240 and determine that the specific item is data that may be used in the recipient field 241.

Furthermore, the controller may consider only the specific item dragged-and-dropped to the messaging application region 240 as data that may be used in the recipient field 241. For example, the controller 180 may analyze the attribute of the specific item dragged-and-dropped to the recipient field 241 and output a message informing the user that the specific item cannot be used in the recipient field 241 when it is determined that that the specific item is not the data that may be used in the recipient field 241.

Figure 11C:
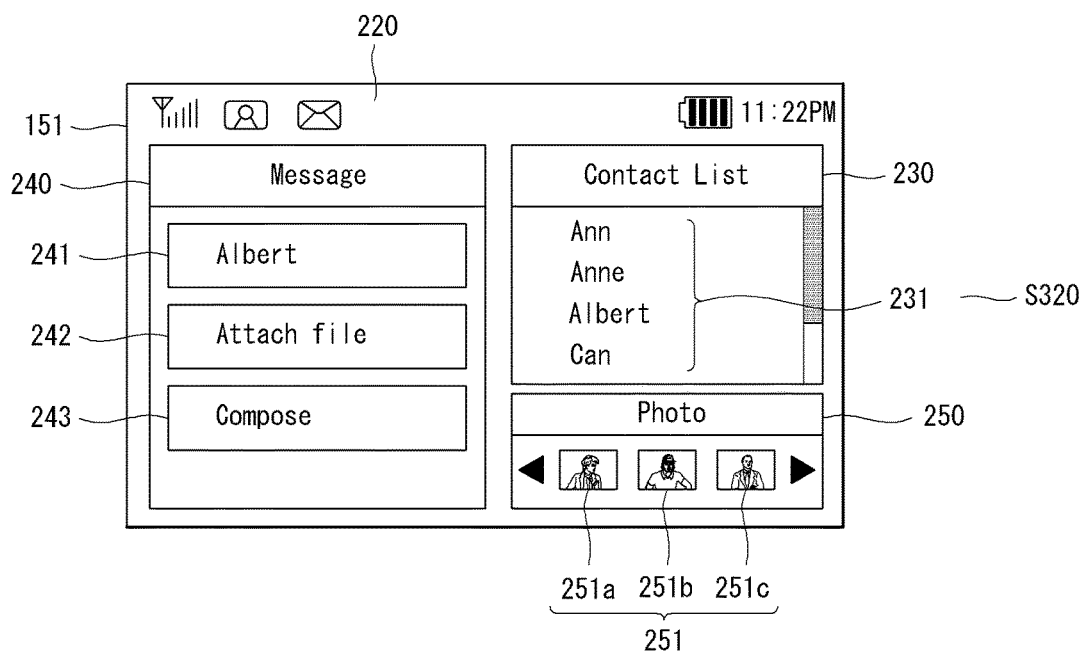

The controller 180 designates the selected specific item as a message recipient (S320). For example, as illustrated in FIG. 11C, "Albert" may be displayed in the recipient field 241.

Figure 11D:
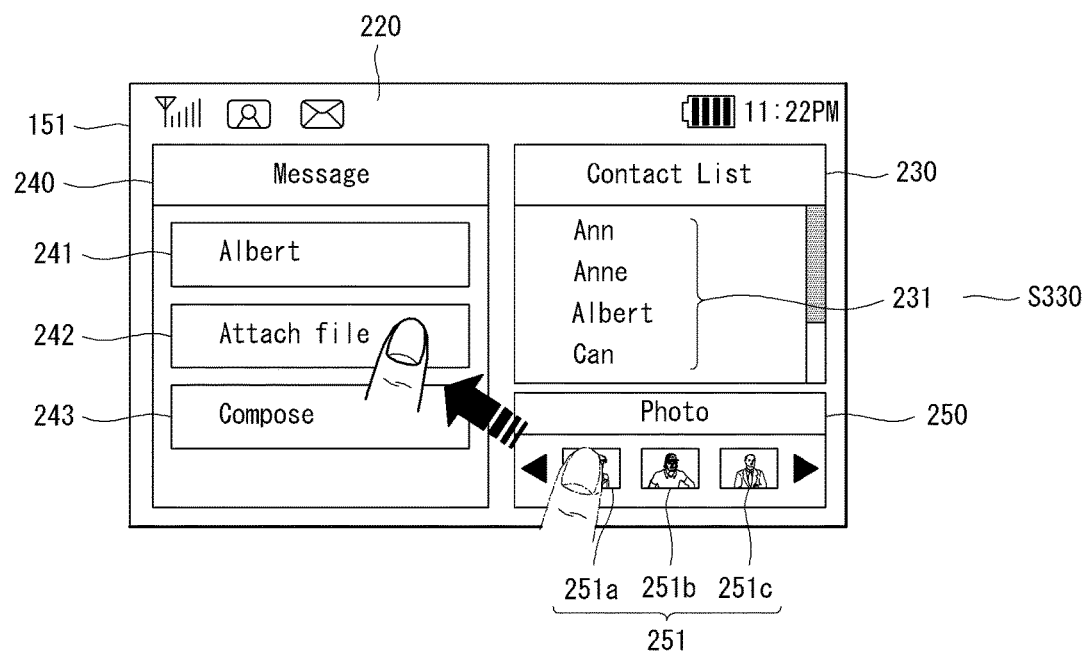

As illustrated in FIG. 11D, the user may touch and select a specific file from the file list 250 and drag-and-drop the selected file to the messaging application region 240 (S330). The user may drag-and-drop the selected file to various points, as described above with respect to step S210. Furthermore, the controller 180 may output a message that informs the user when a specific file dragged-and-dropped to the attachment file field 241 cannot be attached to a message due to a problem or size of the specific file.

Figure 11E:
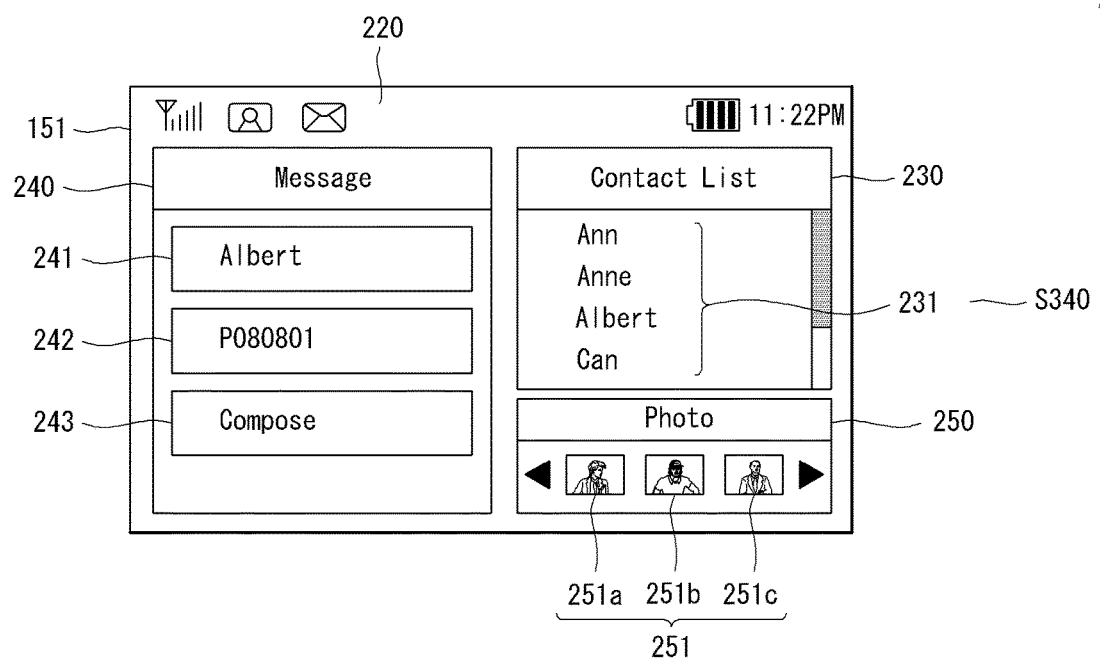

The controller may attach the selected file to the message (S340). For example, as illustrated in FIG. 11E, a file name "P080801" indicating the selected file is displayed in the attachment file field 242.

Figure 12:
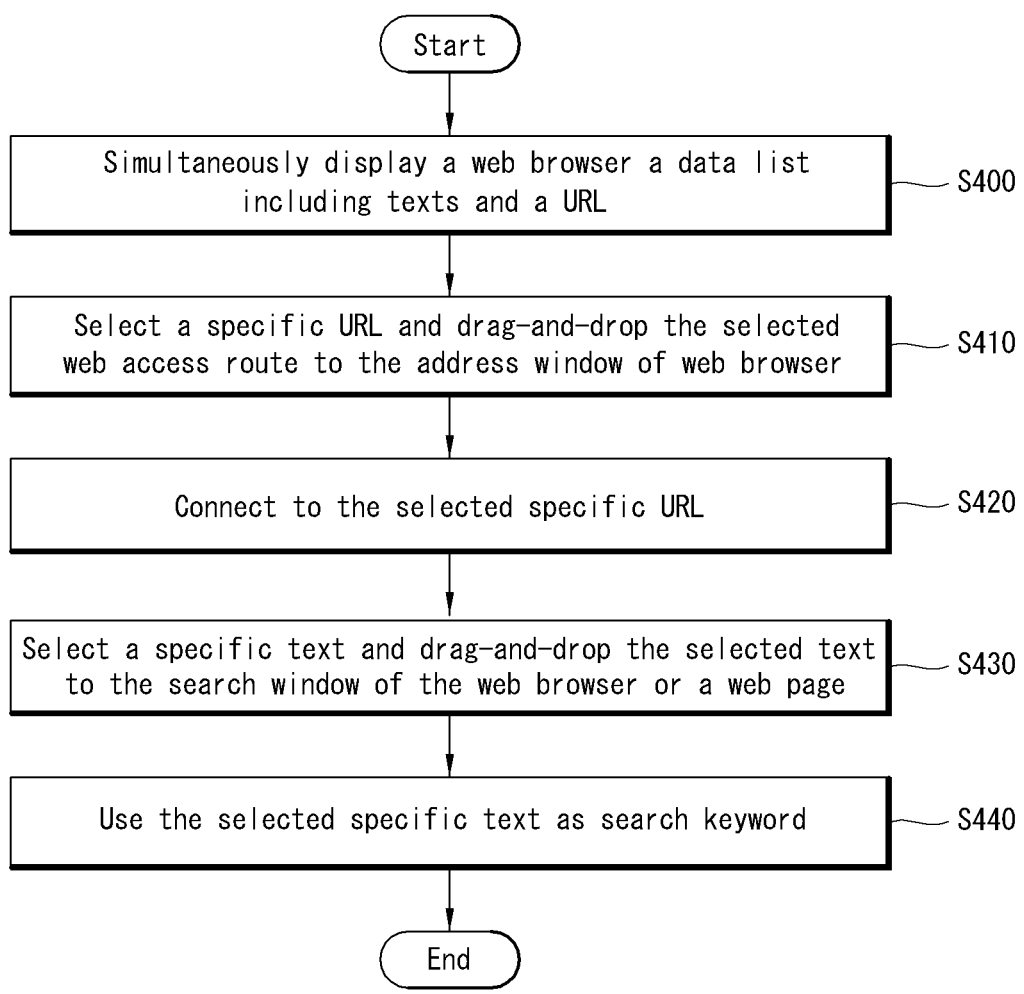
FIG. 12 illustrates a flow chart of a method of processing data in a mobile terminal with a touch screen according to a fourth embodiment of the present invention.

FIG. 12 illustrates a flow chart for a method of processing data in a mobile terminal with a touch screen according to a fourth embodiment of the present invention. In the fourth embodiment, the first application is associated with a web browser. FIGS. 13A through 13E show an example to which the present invention is applied in the video telephony application. The method of processing data in a mobile terminal according to the fourth embodiment of the present invention will now be explained in detail with reference to FIGS. 1, 12, and 13A through 13E.

The controller 180 may simultaneously display a web browser 260, a text list 271, and a data list 272 including a Universal Resource Locator (URL) list 272 in predetermined regions on the display unit 151 (S400). The URL list 272 may display the full URL, such as www.daum.net or display a title associated with a URL, such as "Google". The text list 271 and the URL list 272 may be previously stored by a user or received via the radio communication unit 110 or the interface 170.

Figure 13A:
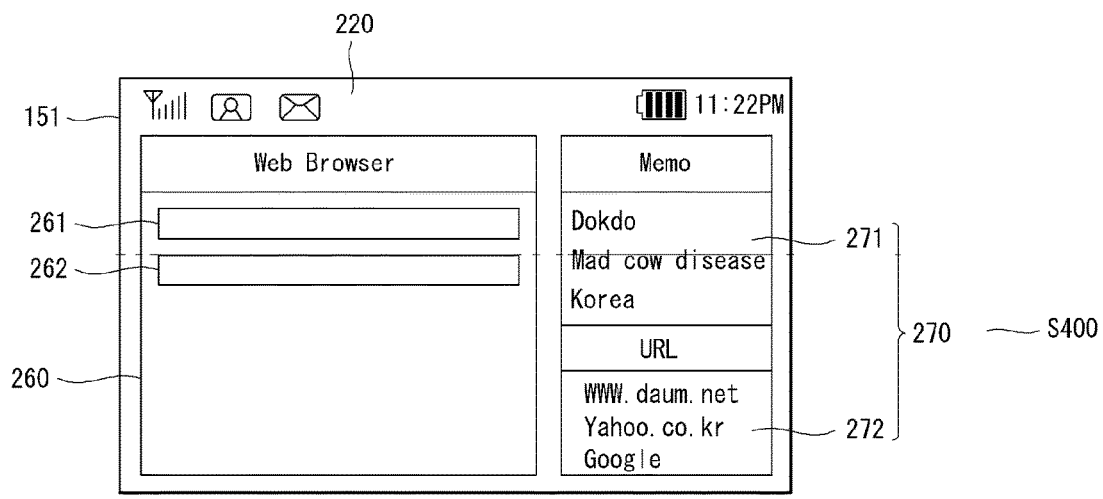
FIGS. 13A through 13E illustrate an example to which the present invention is applied in the video telephony application.
Figure 13B:
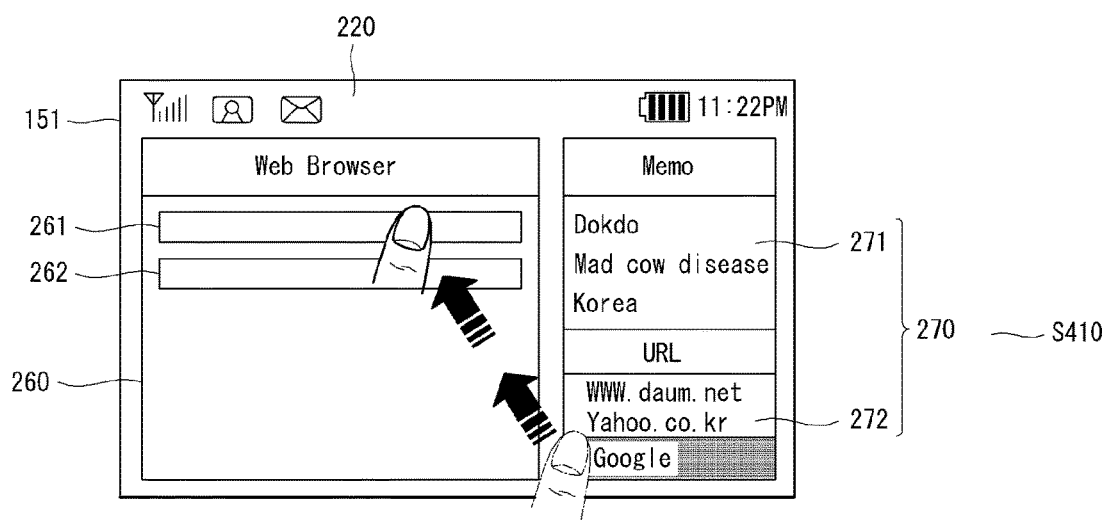
Figure 13C:
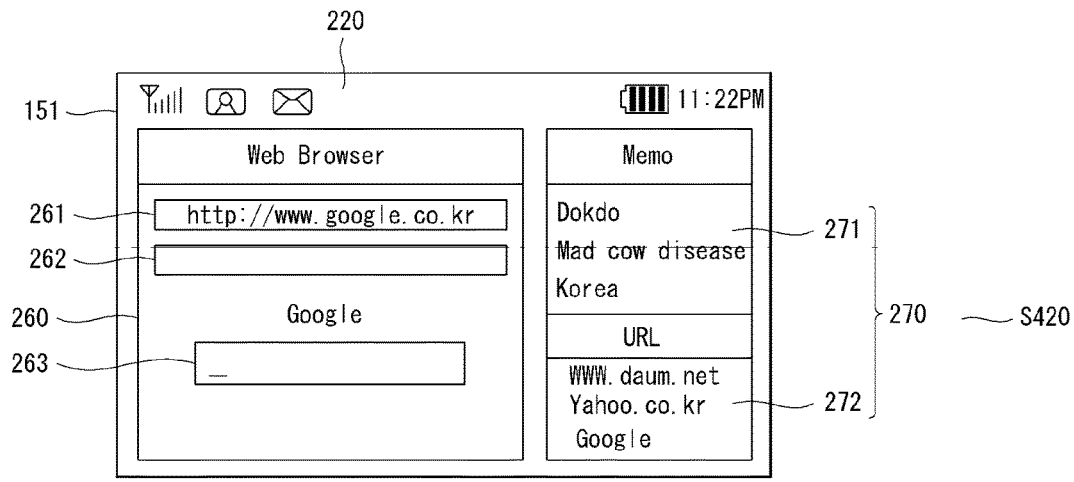

As illustrated in FIG. 13B, the user may touch and select a specific URL from the URL list 272 and then drag-and-drop the selected URL to an address window 261 of the web browser 260 (S410). The web browser 260 may then connect to the selected web access route (S420). Referring to FIG. 13C, the web browser 260 may access a web site "http://www.google.co.kr" corresponding to "Google" to display a web page provided by "Google" as the user drags-and-drops "Google", for example. The web browser 260 may connect to the selected URL via the wireless Internet module 113.

Figure 13D:
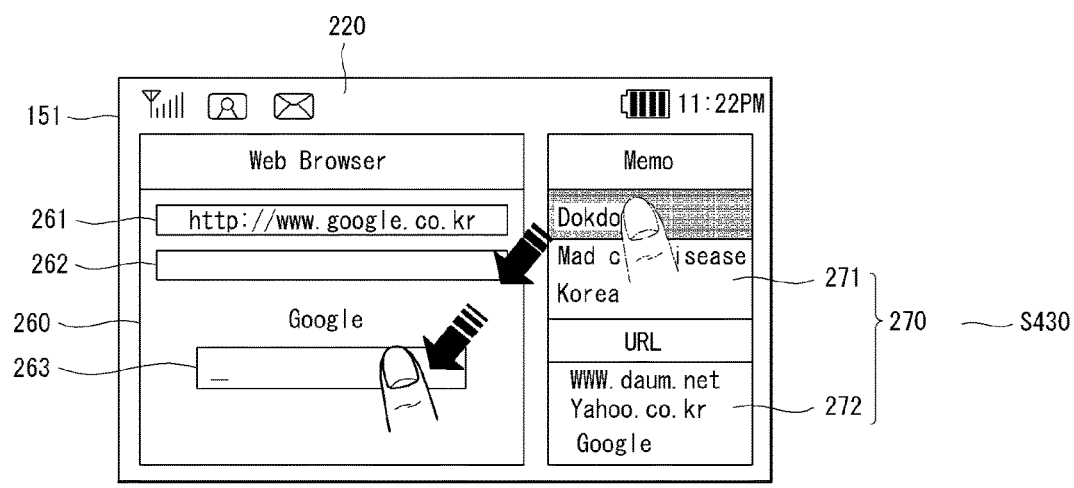
Figure 13E:
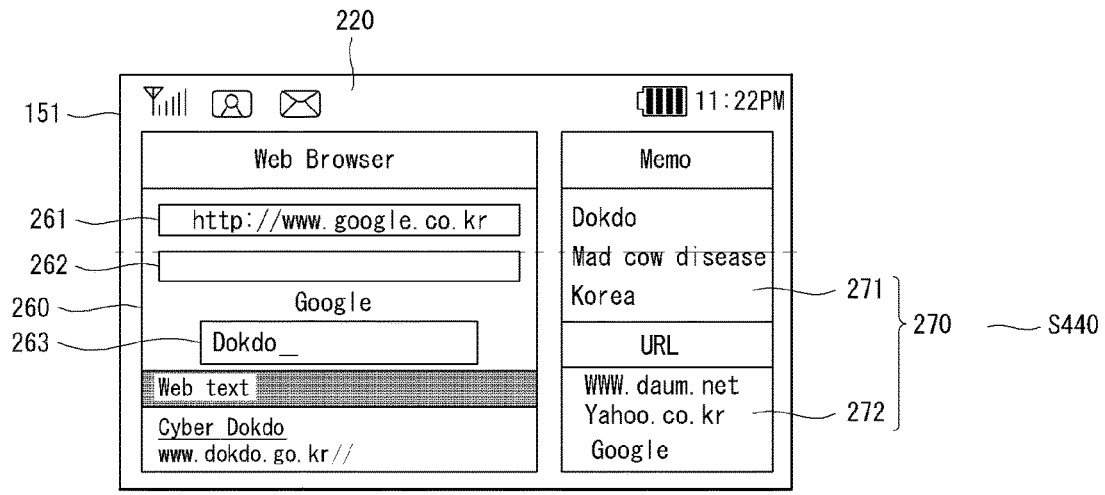

As illustrated in FIG. 13D, the user may touch and select a specific text from the text list 171 and drag-and-drop the selected text to a search window 262 of the web browser 260 or a search window 263 provided by the connected web site (S430). Additionally, as illustrated in FIG. 13E, the web browser 260 may use the selected text as a search keyword for web search (S440).

Figure 14:
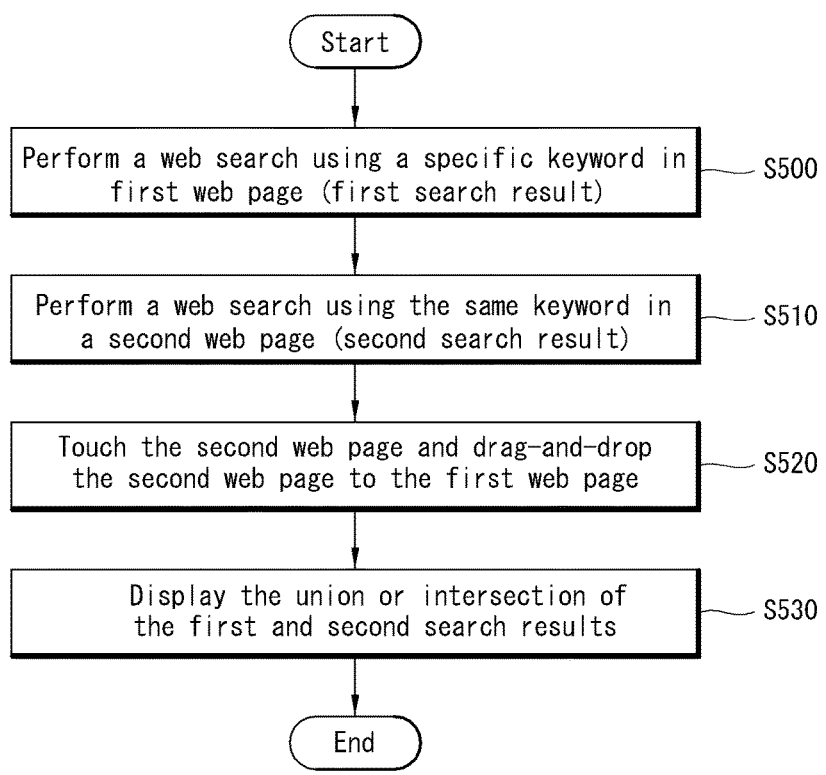
FIG. 14 illustrates a flow chart of a method of processing data in a mobile terminal with a touch screen according to a fifth embodiment of the present invention.

FIG. 14 illustrates a flow chart for a method of processing data in a mobile terminal with a touch screen according to a fifth embodiment of the present invention. FIGS. 15A through 15E, 16A, and 16B illustrate an example to which the present invention is applied for a plurality of web pages. The method of processing data in a mobile terminal according to the fifth embodiment of the present invention will now be explained in detail with reference to FIGS. 1, 14, 15A through 15E, 16A, and 16B.

The controller 180 controls a web browser to perform a web search using a specific keyword in a first web page (S500). The controller 180 controls the web browser to execute the web search using the keyword used in step S500 in a second web page (S510). Search results obtained in steps S500 and S510 are respectively referred to as first and second search results. The operations of steps S500 and S510 are exemplified with reference to FIGS. 15A through 15E.

Figure 15A:
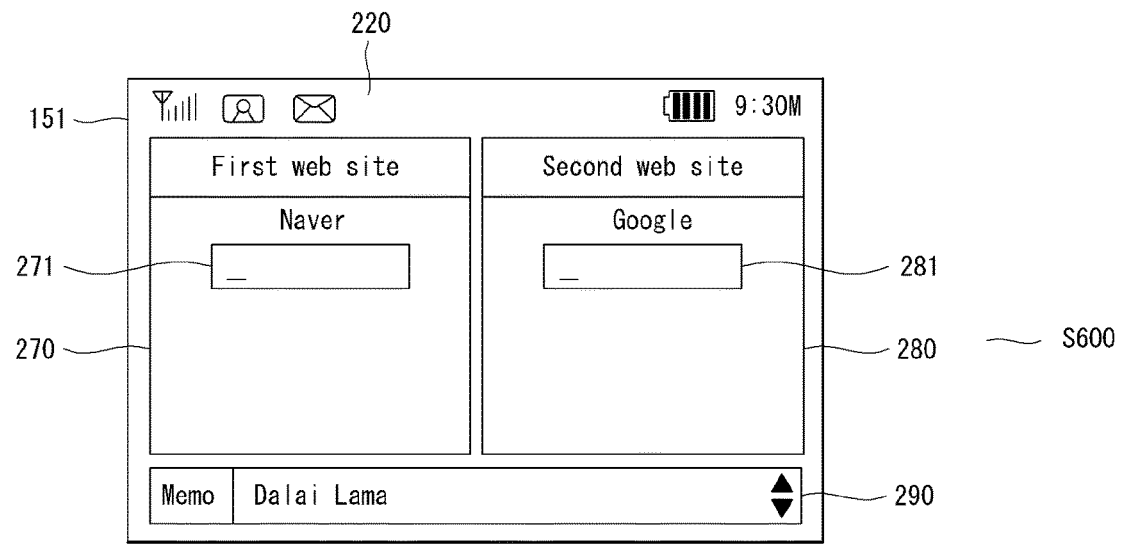
FIGS. 15A through 15E, 16A, and 16B illustrate an example to which the present invention is applied for a plurality of web pages.

FIG. 15A illustrates an example of a display when a first web site and a second web site are accessed. For example, the first web site provides a display 270 for search via "Naver" and the second web site provides a display 280 for search via "Google" (S600). The first web site provides a first search window 271 for performing a web search using a search engine provided by the first web site and the second web site provides a second search window 272 for performing a web search using a search engine provided by the second web site. The display unit 151 displays a memo box 290 in which a text list including at least one text that may be used as a search keyword is displayed, as illustrated in FIG. 15A.

Figure 15B:
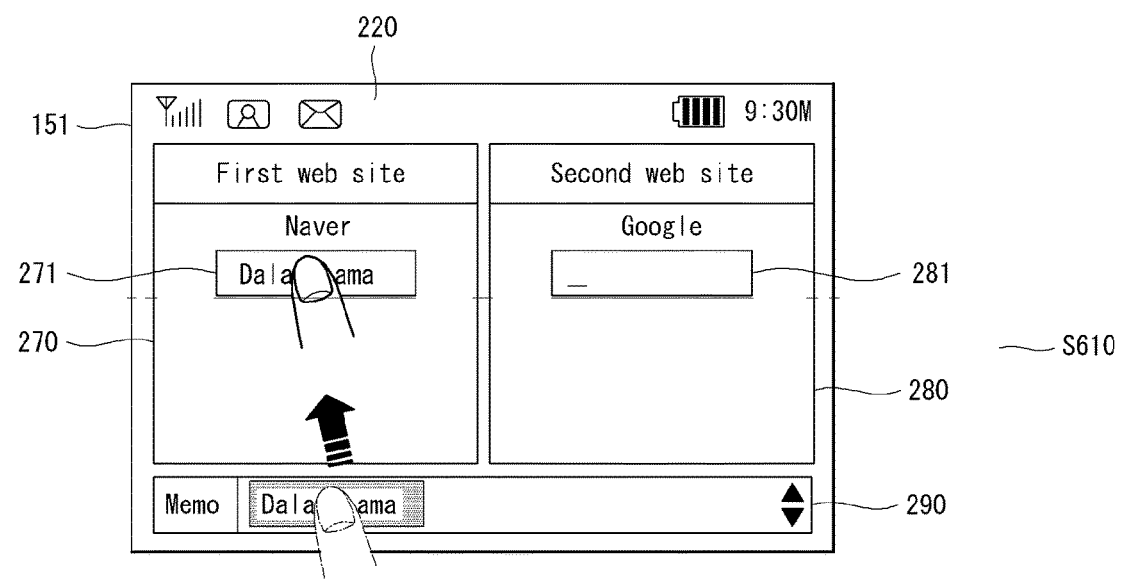
Figure 15C:
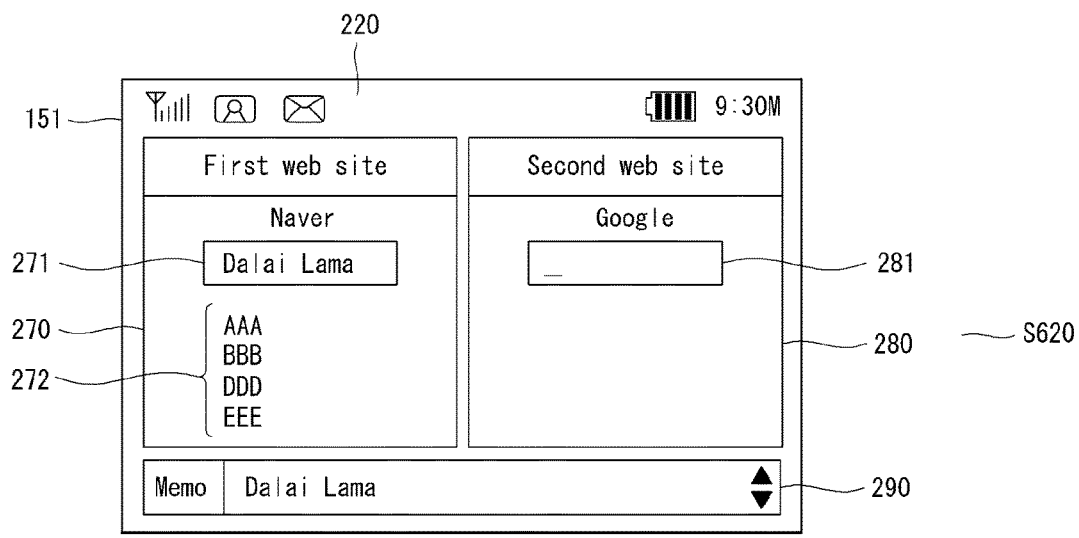

As illustrated in FIG. 15B, a user may touch and select "Dalai Lama" from the memo box 290 and drag-and-drop "Dalai Lama" to the first search window 271 (S610). The first web site may perform a web search using "Dalai Lama" as a keyword and provide the first search result 272 (S620), as illustrated in FIG. 15C.

Figure 15D:
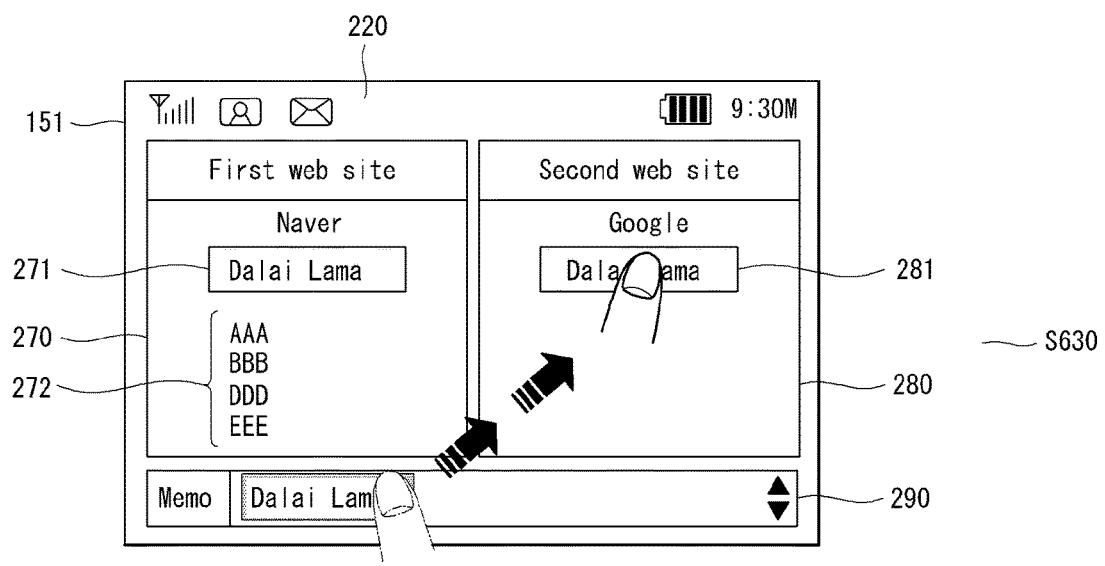
Figure 15E:
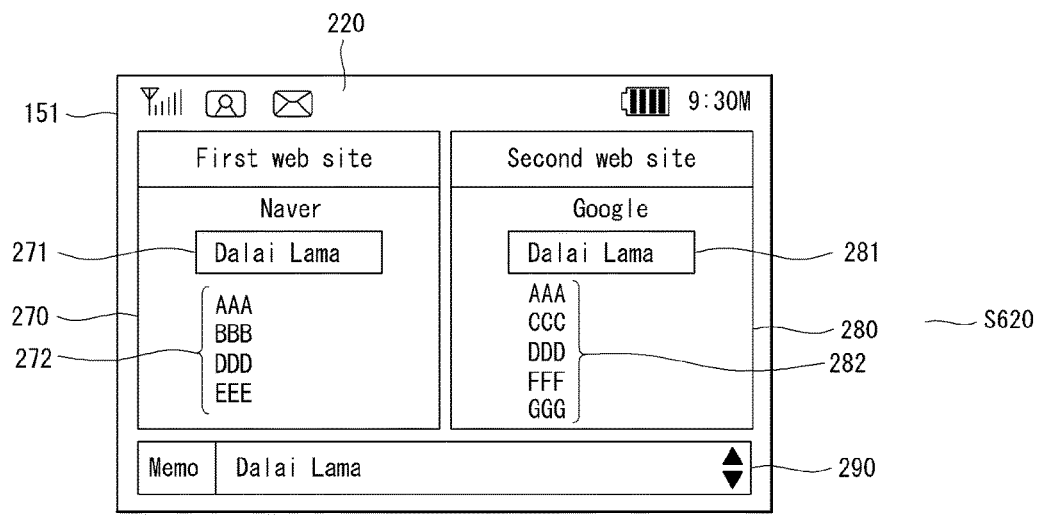

As illustrated in FIG. 15D, a user may touch and select "Dalai Lama" and drag-and-drop "Dalai Lama" to the second search window 281 (S630). The second web site may perform a web search using "Dalai Lama" as a keyword and provide the second search result 282 (S420), as illustrated in FIG. 15E.

The first web site and the second web site may use different search engines. Accordingly, the first search result 272 and the second search result 282 may be different from each other.

Figure 16A:
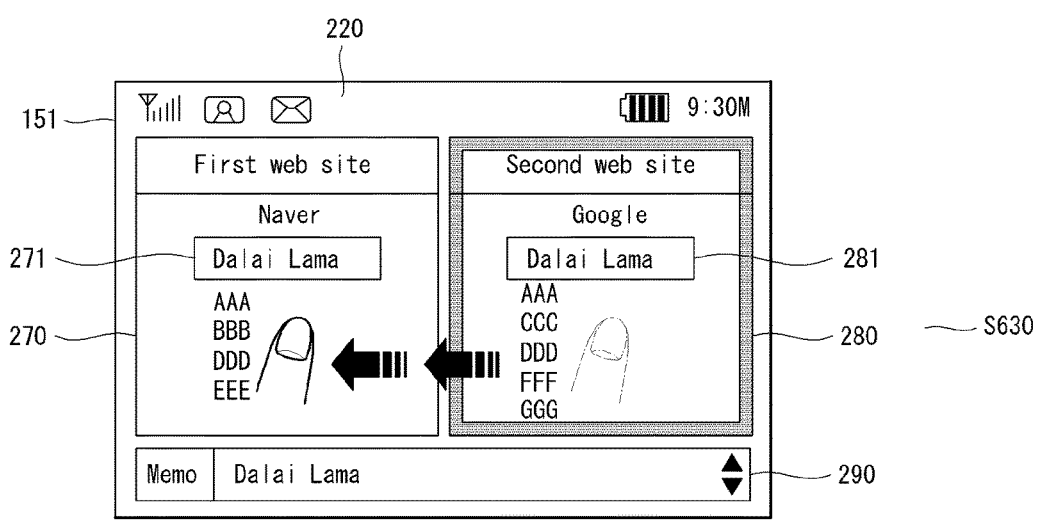

As illustrated in FIG. 16A, a user may touch and select the region where the second web page is displayed and drag-and-drop the selected second web page to the region where the first web page is displayed (S630). The controller 180 may display the union or intersection of the first search result 272 and the second search result 282 on the display unit 151 (S640). The union corresponds to the sum of the first search result 272 and the second search result 282 and the intersection corresponds to common results in the first search result 272 and the second search result 282.

Figure 16B:
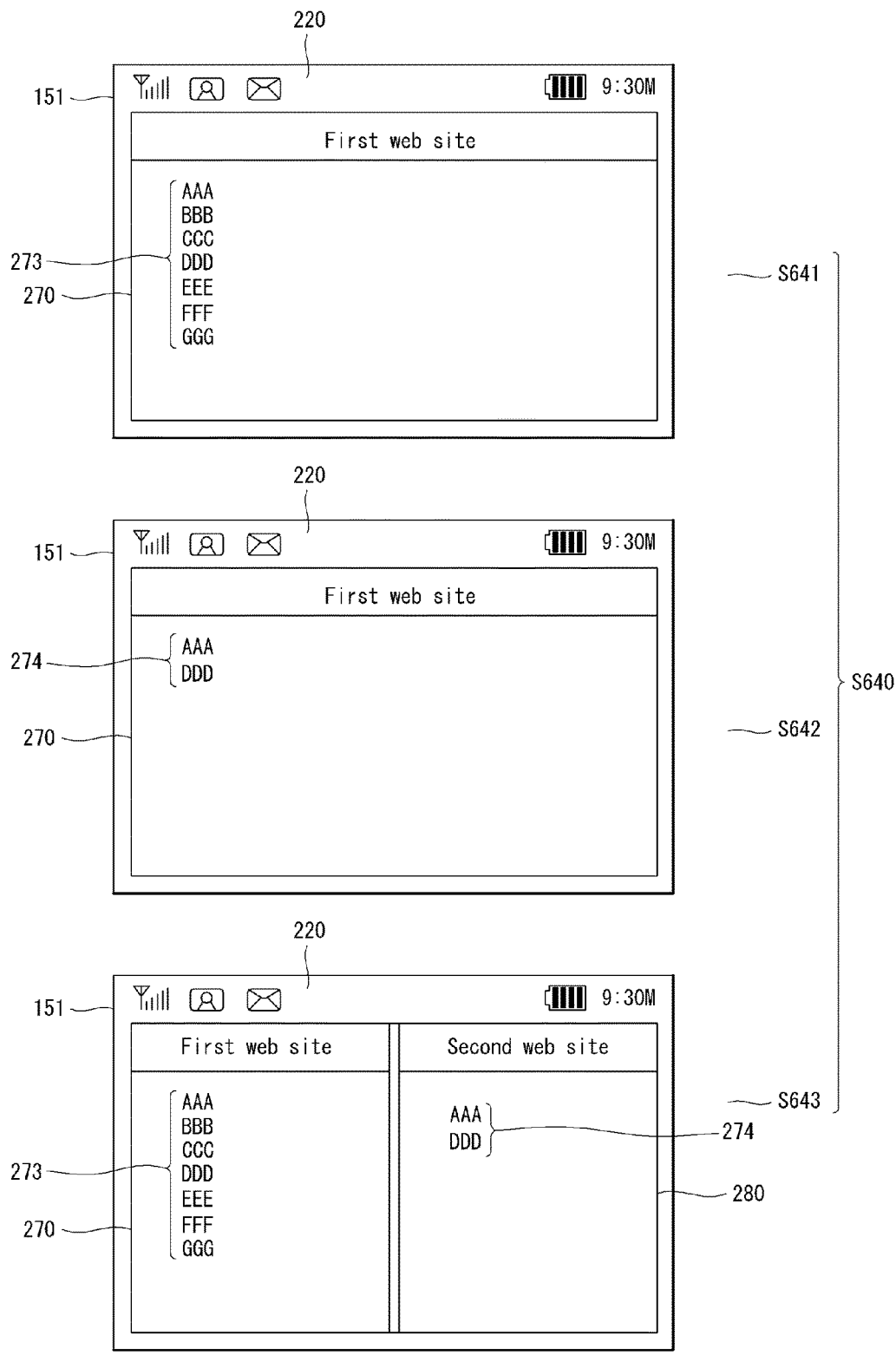

As illustrated in FIG. 16B, the controller 180 may display the union 273 of the first search result 272 and the second search result 282 in the region 270 where the first web page is displayed (S641). Furthermore, the controller 180 may display the intersection 274 of the first search result 272 and the second search result 282 in the region 270 wherein the first web page is displayed (S642). Additionally, the union 273 or the intersection 274 may be displayed in the region 280 where the second web page is displayed or a predetermined region of the display unit 151. For example, the controller 180 may display the union 273 in the region 270 where the first web page is displayed and display the intersection 274 in the region 280 wherein the second web page is displayed (S643).

The above described data processing method in a mobile terminal with a touch screen according to the present invention may be written as computer programs and may be implemented in general-use digital computers that execute the programs using a computer readable recording medium.

The data processing method in a mobile terminal with a touch screen according to the present invention may be executed through software. In this case, constituent means of the present invention are code segments carrying out required works. Programs or code segments may be stored in a processor readable medium and transmitted according to computer data signals combined with carriers in a transmission medium or a communication network.

The computer readable recording medium includes all types of recording devices storing data readable by computer systems. Examples of the computer readable recording medium include ROM, RAM, CD-ROM, DVD±ROM, DVD-RAM, magnetic tapes, floppy disks, hard disks, and optical data storage devices. The computer readable recording medium may also be distributed over networked computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of processing data in a mobile terminal comprising a controller, a touch screen, a memory, and a communication unit, the method comprising:
　displaying a data list comprising a plurality of data items on the touch screen;
　displaying an icon representing a first application on an edge portion of the touch screen while the data list is displayed, wherein the first application is for communicating with a second terminal;
　in response to a touch and drag input for moving the icon from the edge portion to an inner portion of the touch screen, simultaneously displaying:
　　an execution screen corresponding to the first application on a first region of the touch screen corresponding to a position of the moved icon, wherein the execution screen comprises a plurality of function fields for providing different functions, and wherein the plurality of function fields comprise a recipient field, an attachment file field, and a message composition field; and
　　the data list managed by another application that is different from the first application according to an attribute of the data list on a second region of the touch screen, the data list further comprising a contact list and a file list, and the plurality of data items stored in the memory,
　wherein the execution screen and the data list do not overlap when the execution screen and the data list are displayed together on the touch screen;
　displaying a first data item selected from the contact list and dragged to the recipient field of the execution screen in the recipient field in response to an input for selecting, dragging, and dropping the first data item;

displaying a second data item selected from the file list and dragged to the attachment file field of the execution screen in the attachment file field in response to an input for selecting, dragging, and dropping the second data item; and transmitting the second data item displayed in the attachment file field to the second terminal corresponding to the first data item displayed in the recipient field via the communication unit, wherein the controller controls the touch screen, memory, and communication unit.

2. The method of claim 1, wherein the data list further comprises at least text, a still image, a moving image, a phone number, or an Internet address.

3. The method of claim 1, wherein at least the execution screen or the data list is movable on the touch screen.

4. The method of claim 1, further comprising displaying a plurality of data lists in a third region of the touch screen.

5. A mobile terminal comprising:

a touch screen;

a controller configured to control the touch screen, communication unit, and memory;

the controller configured to:

cause the touch screen to display a data list comprising a plurality of data items;

cause the touch screen to display an icon representing a first application on an edge portion of the touch screen while the data list is displayed, wherein the first application is for communicating with a second terminal;

in response to a touch and drag input for moving the icon from the edge portion to an inner portion of the touch screen, cause the touch screen to simultaneously display:

an execution screen corresponding to the first application on a first region of the touch screen corresponding to a position of the moved icon, wherein the execution screen comprises a plurality of function fields for providing different functions, and wherein the plurality of function fields comprise a recipient field, an attachment file field, and a message composition field; and the data list managed by another application that is different from the first application according to an attribute of the data list on a second region of the touch screen, the data list further comprising a contact list and a file list, and the plurality of data items stored in the memory, wherein execution screen and the data list do not overlap when the execution screen and the data list are displayed together on the touch screen;

cause the touch screen to display a first data item selected from the contact list and dragged to the recipient field of the execution screen in the recipient field in response to an input for selecting, dragging, and dropping the first data item;

cause the touch screen to display a second data item selected from the file list and dragged to the attachment file field of the execution screen in the attachment file field in response to an input for selecting, dragging, and dropping the second data item; and cause the communication unit to transmit the second data item displayed in the attachment file field to the second terminal corresponding to the first data item displayed in the recipient field.

6. The method of claim 5, wherein the data list further comprises at least text, a still image, a moving image, a phone number, or an Internet address.

7. The mobile terminal of claim 5, wherein at least the messaging application screen or the data list is movable on the touch screen.

8. The mobile terminal of claim 5, wherein the controller is further configured to control a plurality of data lists displayed on other display regions of the touch screen.

\* \* \* \* \*